United States Patent
Fujii et al.

(10) Patent No.: US 7,463,698 B2
(45) Date of Patent: Dec. 9, 2008

(54) TRANSMITTER AND TRANSMISSION CONTROL METHOD

(75) Inventors: Hiromasa Fujii, Yokosuka (JP); Jiyun Shen, Yokohama (JP); Takahiro Asai, Yokosuka (JP); Hirohito Suda, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 584 days.

(21) Appl. No.: 11/131,260

(22) Filed: May 18, 2005

(65) Prior Publication Data

US 2005/0265479 A1 Dec. 1, 2005

(30) Foreign Application Priority Data

May 25, 2004 (JP) ............................. 2004-155032

(51) Int. Cl.
*H04B 1/02* (2006.01)
(52) U.S. Cl. .................. 375/303; 375/295; 327/291; 332/106; 341/20; 341/173
(58) Field of Classification Search .......... 375/295; 327/291; 332/106; 341/20, 173
See application file for complete search history.

(56) References Cited

U.S. PATENT DOCUMENTS

2002/0181390 A1* 12/2002 Mody et al. ............... 370/208

2004/0160893 A1* 8/2004 Park et al. .................. 370/206

OTHER PUBLICATIONS

Cyclic shifting and time inversion of partial transmit sequences to reduce the peak-to-average power ratio in OFDM Hill, G.; Faulkner, M.; Singh, J.; Personal, Indoor and Mobile Radio Communications, 2000. PIMRC 2000. The 11th IEEE International Symposium on vol. 2, Sep. 18-21, 2000 pp. 1256-1259 vol. 2.*
Xiaodong Li, et al., "Effects of Clipping and Filtering on the Performance of OFDM", IEEE Communications Letters, vol. 2, No. 5, May 1998, pp. 131-133.
Leonard J. Cimini, Jr., et al., "Peak-to-Average Power Ratio Reduction of an OFDM Signal Using Partial Transmit Sequences", IEEE Communications Letters, vol. 4, No. 3, Mar. 2000, pp. 86-88.
G.R. Hill, et al., "Reducing the peak-to-average power ratio in OFDM by cyclically shifting partial transmit sequences", Electronics Letters, vol. 36, No. 6, Mar. 16, 2000, pp. 560-561.
Kazumi Miyashita, et al., "Eigenbeam-Space Division Multiplexing (E-SDM) in a MIMO Channel", The Institute of Electronics, Information and Communication Engineers, Technical Report of IEICE, RCS2002-53, (May 2002), pp. 13-18, (with English Abstract).

* cited by examiner

*Primary Examiner*—Shuwang Liu
*Assistant Examiner*—Michael R Neff
(74) *Attorney, Agent, or Firm*—Oblon, Spivak, McClelland, Maier & Neustadt, P.C.

(57) ABSTRACT

A transmitter has a peak reducing part carrying out peak reduction processing; an OFDM signal generating part generating an OFDM signal from an input information signal; a cyclic shifting part generating a signal obtained from cyclically shifting the OFDM signal; and an adding part adding the OFDM signal and the cyclically shifted signal together.

10 Claims, 17 Drawing Sheets

FIG.4
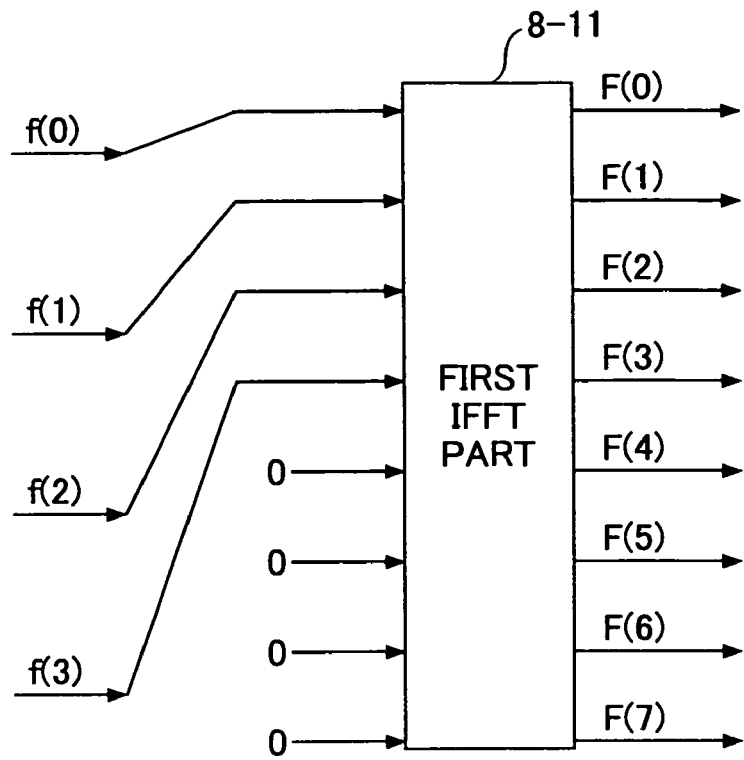
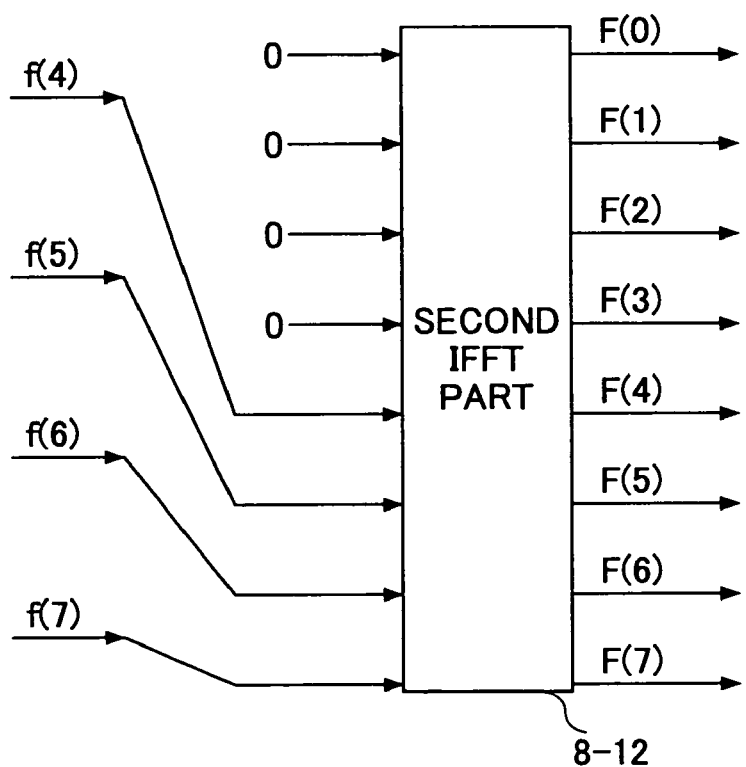

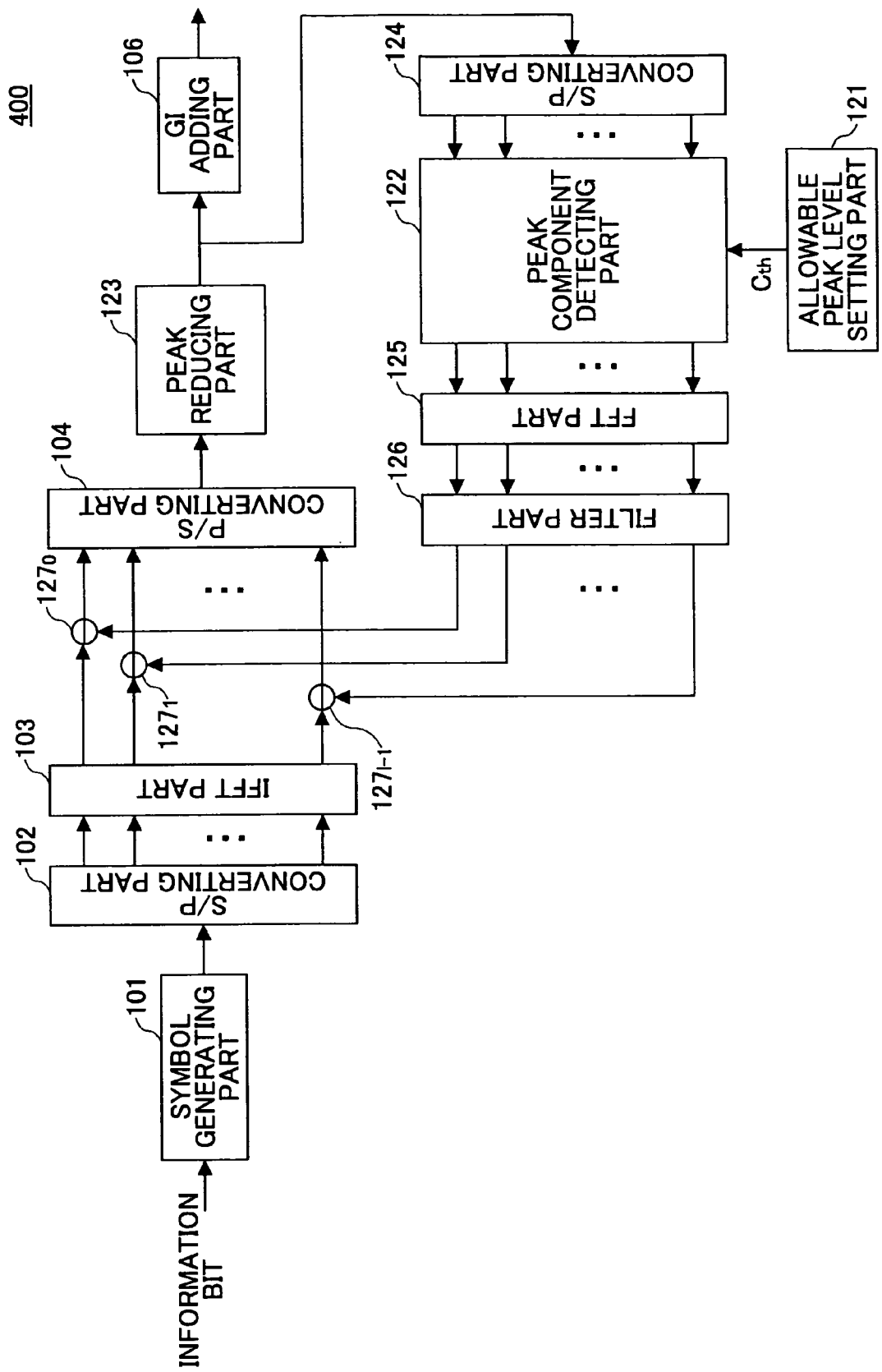

TRANSMITTER AND TRANSMISSION CONTROL METHOD

BACKGROUND OF THE INVENTION

1. Field of the Invention

The present invention relates to a transmitter applied for radio communication, and a transmission control method therefor.

2. Description of the Related Art

An OFDM (orthogonal frequency division multiplexing) transmission system has taken attention as a system avoiding influence of inter-symbol interference, even in a multi-path transmission environment. FIG. 1 shows a configuration of a transmitter applied in the OFDM transmission system.

A transmitter 1 shown includes a symbol generating part 2 to which information bits are input; a S/P (serial/parallel) converting part 3 connected with the symbol generating part 2; an IFFT (inverse fast Fourier transform) part 4 connected to the S/P converting part 3; a P/S (parallel/serial) converting part 5 connected to the IFFT part 4; a GI adding part 6 connected to the P/S converting part 5 and an antenna 7 connected to the GI adding part 6.

When information bits are input to the symbol generating part 2, the symbol generating part 2 carries out, on the input information bit series, error correction coding, interleaving, symbol mapping and so forth, as in a single carrier transmission system, so as to generate transmission symbols, which are then input to the S/P converting part 3. The S/P converting part 3 converts the input transmission symbols in a serial form into a parallel form, and inputs the thus-obtained signal into the IFFT part 4. The IFFT part 4 converts the input signal into an orthogonal multi-carrier signal, and inputs the thus-obtained signal to the P/S converting part 5. The P/S converting part 5 converts the thus-input signal in the parallel form into a serial form, and inputs the thus-obtained signal into the GI adding part 6. The GI adding part 6 inserts guard intervals in which part of the input signal is copied. The signal thus having the guard intervals inserted thereto is then transmitted via the antenna 7.

Upon carrying out the OFDM transmission, a signal having a very large amplitude in comparison to an average amplitude appears in the output signal of the IFFT part 4.

This problem is a feature of the multi-carrier modulation system. In the multi-carrier modulation system, many carrier signal components individually modulated may be combined. Then some of the combined signal become to have large amplitudes, while some of them become to have small amplitudes. The possible maximum peak power amounts to a value larger than the average power by a factor of the number of subcarriers.

The PAPR (peak to average power ratio) may in particular become problematic due to characteristics of a transmission amplifier. In the transmission amplifier, a range in which input/output characteristics of the amplifier are linear is limited. When a signal beyond the linear range is input, an output waveform is distorted accordingly. Thereby, a problem such as degradation in the transmission quality, increase in power radiation to the outside of the band, or such may occur. Further, it is known that, when the linear range is widened, the amplification efficiency degrades. It is preferable that the PAPR of transmission signal is low.

As a method of reducing the PAPR, clipping (+filtering) (for example, see the non-patent document #1, listed below); a PTS method (for example, see the non-patent document #2); and a cyclic shifting method (for example, see the non-patent document #3) have been proposed:

Non-patent document #1: X. Li and L. J. Cimini, "Effects of clipping and filtering on the performance of OFDM", IEEE Commun. Lett., vol. 2, no. 5, pp. 131-133, May 1998;

Non-patent document #2: L. J and N. R. Sollenberger, "Peak-to-Average power ratio reduction of an OFDM signal using partial transmit sequence", IEEE Commun. Lett., vol. 4, no. 3, pp. 86-88, March 2000;

Non-patent document #3: G. R. Hill, M. Faulkner and J. Singh, "Reducing the peak-to-average power ratio in OFDM by cyclically shifting partial transmit sequence", Electronics Letters, vol. 36, No. 6, pp. 560-561, March 2000; and Non-patent document #4: Miyashita, Nishimura et al., "Eigenbeam-Space Division Multiplexing (E-SDM) in a MIMO Channel", The Institute of Electronics, Information and Communication Engineers, Technical Report of IEICE, RCS2002-53 (2002-05).

In the clipping, a peak is replaced by a signal which has a predetermined amplitude and the same phase as the original signal.

FIG. 2 illustrates a configuration of a transmitter applied when peak reduction is carried out according to the PTS method or the cyclic shifting method.

In this transmitter, a low peak IFFT part 8 is applied instead of the IFFT part 4 in the configuration of the transmitter 1 described with reference to FIG. 1.

A configuration of the low peak IFFT-part 8 is described now with reference to FIG. 3.

As shown in FIG. 3, the low peak IFFT part 8 includes a separated IFFT part 8-1, a combining part 8-2 connected to the separated IFFT part 8-1. The combining part 8-2 includes peak reducing parts 8-21 and 8-22 connected to the separated IFFT part 8-1, a peak reduction control part 8-23 connected to the peak reducing parts 8-21 and 8-22 and the separated IFFT part 8-1, and an adding part 8-24 connected to the peak reducing parts 8-21 and 8-22. The adding part 8-24 includes a plurality of adders connected to the peak reducing parts 8-21 and 8-22. An output signal of the adding part 8-24 is input to the P/S converting part 5.

In this method, the separated IFFT part 8-1 divides a plurality of input subcarriers into a plurality of groups, for example, $N_G$ groups ($N_G$ is an integer and $N_G>1$), and carries out IFFT thereon. The configuration of the separated IFFT part 8-1 is illustrated with reference to FIG. 4 for example in which 8 points of IFFT are divided into two groups.

The separated IFFT 8-1 includes a first IFFT part 8-11 and a second IFFT part 8-12. For example, for generating temporal signals corresponding to f(0) through f(3), a signal to be transformed are input to the f(0) through f(3) of the first IFFT part 8-11, while 0 is input to f(4) through f(7). In this configuration, since the two IFFT parts 8-11 and 8-12 are used, a calculation amount becomes double compared with the case that the dividing is not carried out is required for the IFFT processing.

The IFFT output in the configuration of FIG. 1 is equal to the sum of the outputs of the first and second IFFT parts 8-11 and 8-12.

In this system applying the PAPR reduction according to the cyclic shifting method or the PTS method, the peak reducing parts 8-21 and 8-22 carry out cyclic shifting or phase rotation on the input signals [F(0) F(1) ... F($N_{FFT-1}$)]. After that, the thus-obtained signal components are added by the adding part 8-24. The peak reduction control part 8-23 controls the cyclic shifting amount or the phase rotation amount in such a manner as to reduce the peak appearing in the output signals. Thereby, generation of a large peak is suppressed.

Further, it is noted that, when such processing is carried out in the transmitter, the shift amount of the phase rotation should be notified of to a receiver. As a method of notifying of the information, for example, a method of utilizing a control signal, a method which applies the same shift amount or phase rotation on pilot signal and data signal, or such may be applied.

SUMMARY OF THE INVENTION

However, the following problems may occur in the above-described background arts:

That is, in a case where the clipping (+filtering) is applied to reduce the PAPR, orthogonality among the subcarriers may not be kept, inter-subcarrier interference may occur, and thus, transmission performance may degrade.

In a case where the PTS method or the cyclic shifting method is applied to reduce the PAPR, the control signal is required as mentioned above, and thus, a separate channel should be provided for the control signal.

Further, it is necessary to carry out, in a receiver upon receiving a transmitted signal, operation inverse to the peak reducing operation when the same signal is transmitted.

According to the related art, a plurality of IFFT parts are required for in the transmitter.

The present invention has been devised in consideration of the situation, and an object of the present invention is to provide a transmitter and a transmission control method by which peak reduction can be carried out without the necessity of transmission of the control signal for the peak reduction processing.

For this purpose, according to the present invention, a transmitter includes: a peak reducing part carrying out peak reduction processing; an OFDM signal generating part generating an OFDM signal from input information signal; a cyclic shifting part generating a signal obtained from cyclically shifting the OFDM signal; and an adding part adding the OFDM signal and the cyclically shifted signal together. In this configuration, peak suppression can be carried out Further, a shift amount determining part determining a shift amount based on at least one of the OFDM signal and an output signal of the adding part may be provided, wherein: the cyclic shifting part may generate the signal cyclically shifted from the OFDM signal based on the shift amount determined by the shift amount determining part. In this configuration, the shift amount can be controlled, and thus, it is possible to achieve PARR reduction more effectively.

Further, a weight generating part generating, based on the OFDM signal, weights for the OFDM signal and the cyclically shifted signal in such a manner that a peak power may be reduced; and a multiplying part multiplying the OFDM signal or the cyclically shifted signal with the weights generated by the weight generating part may be provided, wherein: the adding part may add the output signals of the multiplying part together. In this configuration, the shift amount can be controlled, and the cyclically shifted signal can be multiplied with a complex coefficient. Accordingly, it is possible to carry out peak power reduction more efficiently.

Further, the weight generating part may determine the weights $w_1$ and $w_2$ as follows:

It is ideal to determine the weights such that:

$$|s_1'|=|s_2'|,$$

where:

$$s_1'=w_1 \times s(tp)+w_2 \times s(\text{mod}(tp-t'+N_{FFT}, N_{FFT}))$$

$$s_2'=w_2 \times s(\text{mod}(tp+t', N_{FFT}))+w_1 \times s(tp),$$

where $w_1$, $w_2$ denote the weights,
mod denotes a remainder operator; and
$N_{FFT}$ ($N_{FFT}$ is an integer and $N_{FFT}>0$) denotes an FFT point.

However, actually, it is not possible to directly calculate the weights satisfying the above-mentioned requirements. Therefore, although the weights actually obtained are not necessarily those strictly satisfying these requirements, the weights are calculated by the following method:

The amplitudes of $s(tp+t')$ and $s(tp-t')$ are compared, and the phase of the symbol having a smaller amplitude may become opposite from a phase of $s(tp)$, where $s(tp)$ denotes a symbol causing a peak of the OFDM signal.

The weight generating part may determine a phase rotation angle according to the following requirements, where:

(iii) $\theta$ denotes the phase rotation angle; and $s(tp)$ denotes a symbol causing a peak of the OFDM signal, $$\theta_1=\pi-[\arg(s(\text{mod}(tp-t+N_{FFT}, N_{FFT})))-\arg(s(tp))];$$

$$\theta_2=\pi-[\arg(s(\text{mod}(tp+t, N_{FFT})))-\arg(s(tp))]; \text{ and}$$

$$\theta=\{|s(\text{mod}(tp+t, N_{FFT}))|\times\theta_1+|s(\text{mod}(tp-t+N_{FFT}, N_{FFT}))|\times\theta_2\}/\{|s(\text{mod}(tp-t+N_{FFT}, N_{FFT}))|+|s(\text{mod}(tp+t,N_{FFT}))|\},$$

where mod denotes a remainder operator; and
$N_{FFT}$ ($N_{FFT}$ is an integer and $N_{FFT}>0$) denotes an FFT point.

Thus, the phase rotation angle can be obtained.

Further, the shift amount determining part may determine the shift amount so that a value calculated by the following formula may be equal to or more than a fixed value:

$$\text{Re}\{s(tp+t')\times s(tp-t')/s(tp)^2\}$$

where:
$s(tp)$ denotes a symbol causing a peak of the OFDM signal, and $t'$ denotes the shift amount; and
the weight generating part may generate the weights based on the shift amount.

Thereby, it is possible to estimate the shift amount without calculating the weights.

Further, a plurality of the cyclic shifting parts may be provided, wherein: the shift amount determining part may determine the shift amount for each of the plurality of cyclic shifting parts based on at least one of the OFDM signal and the cyclically shifted signal; and the weight generating part may generate the weights based on at least one of the OFDM signal and the cyclically shifted signal. Thereby, it is possible to effectively determine the shift amount and the complex coefficients.

Further, the shift amount determining part may determine a maximum shift amount in such a manner that the following requirements may be met, when a scattered pilot signal is applied:

((the number of FFT points)/(pilot signal inserting interval))≧(maximum shift amount)+(impulse response length), based on an input impulse and a pilot signal, where the pilot signal inserting interval is an interval in a frequency direction. In this configuration, it is possible to control the shift amount within a fixed amount, and it is possible to satisfactorily estimate transmission characteristics also for a subcarrier for which the scattered pilot signal is not inserted by means of interpolation in the frequency direction.

Further, a plurality of peak reducing parts, connected together in series or in parallel may be provided; wherein: each peak reducing part may includes: an OFDM signal generating part generating an OFDM signal from input information signal; a cyclic shifting part generating a signal cyclically shifted from the OFDM signal; and an adding part adding the OFDM signal and the cyclically shifted signal together. Thereby, it is possible to achieve different types of processing to be carried out by the respective ones of the plurality of the peak reducing parts, and thus, it is possible to efficiently carry out the peak suppression.

Further, a plurality of antennas may be provided, wherein: the shift amount determining part and the weight determining part may determine at least the shift amount and the weights in such a manner that the same may be different for each antenna. Thereby, it is possible to avoid a situation in which channels from transmission antennas to reception antennas become related to each other and thus the respective channels are hardly separated. Accordingly, signal separation can be easily achieved, and thus error rate characteristics can be improved.

Further, a coefficient generating part determining a plurality of the shift amounts and the weights; a transmission weight generating part generating a second channel estimation value and generating a plurality of transmission weights, based on a channel estimation value, the plurality of shift amounts and weights; an ESDM signal generating part generating a plurality of ESDM signals based on the plurality of transmission weights; and a selecting part selecting, from the plurality of ESDM signals, a signal having a low peak, may be provided. Thereby, it is possible to obtain the number of transmission signal candidates, the same as the number of sets of the shift amounts and the complex coefficients. Then, thereamong, the transmission signal having the reduced peak can be selected.

Further, according to the present invention, a transmission control method for a transmitter carrying out peak reduction processing, includes the steps of: a) generating an OFDM signal from an input information signal; b) generating a signal cyclically shifted from the OFDM signal; and c) adding the OFDM signal and the cyclically shifted signal together. Thereby, it is possible to effectively carry out peak suppression.

Thus, according to embodiments of the present invention described below, it is possible to provide the transmitter and the transmission control method by which peak reduction can be achieved without the necessity of transmitting a control signal concerning the peak reduction processing.

BRIEF DESCRIPTION OF THE DRAWINGS

Other objects and further features of the present invention will become more apparent from the following detailed description when read in conjunction with the following drawings:

FIG. 4 shows a block diagram illustrating a separated IFFT part;

FIG. 18 shows a block diagram illustrating a transmitter according to an eleventh embodiment of the present invention.

DETAILED DESCRIPTION OF THE PREFERRED EMBODIMENTS

Figure 1:
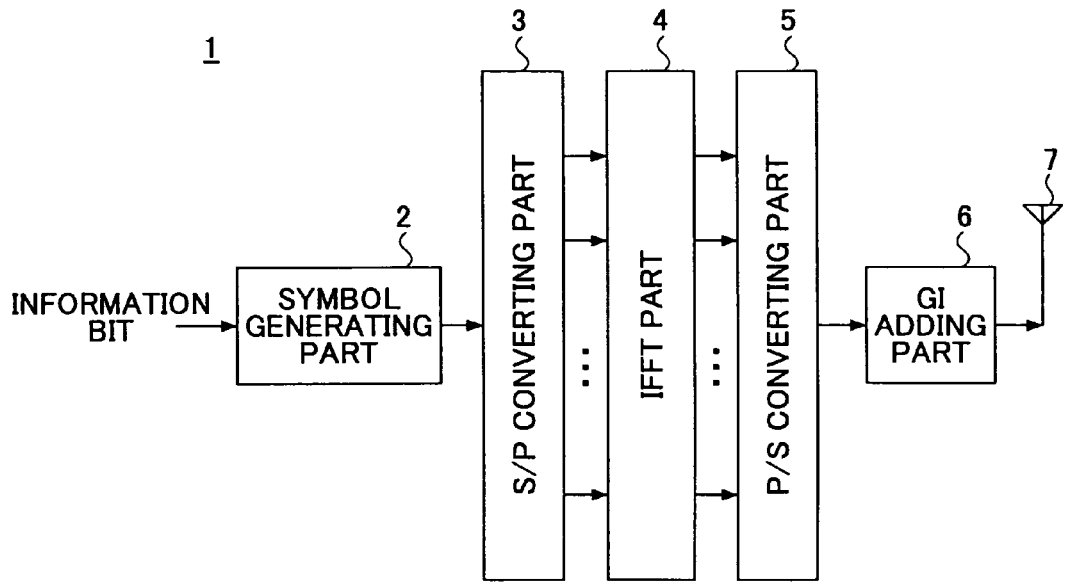
FIG. 1 shows a block diagram illustrating an OFDM transmitter.
Figure 2:
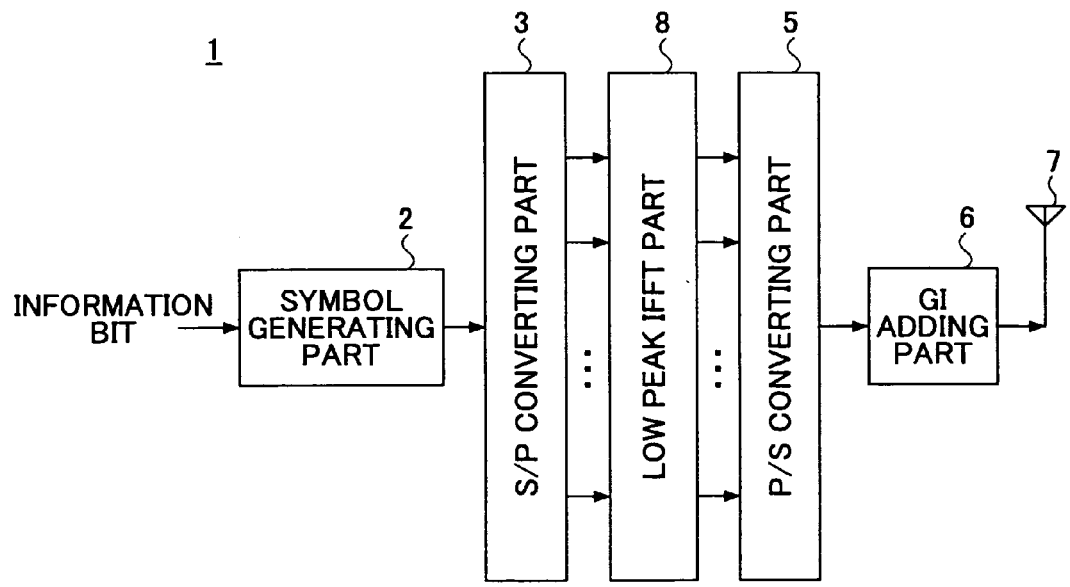
FIG. 2 shows a block diagram illustrating an OFDM transmitter carrying out peak reduction.
Figure 3:
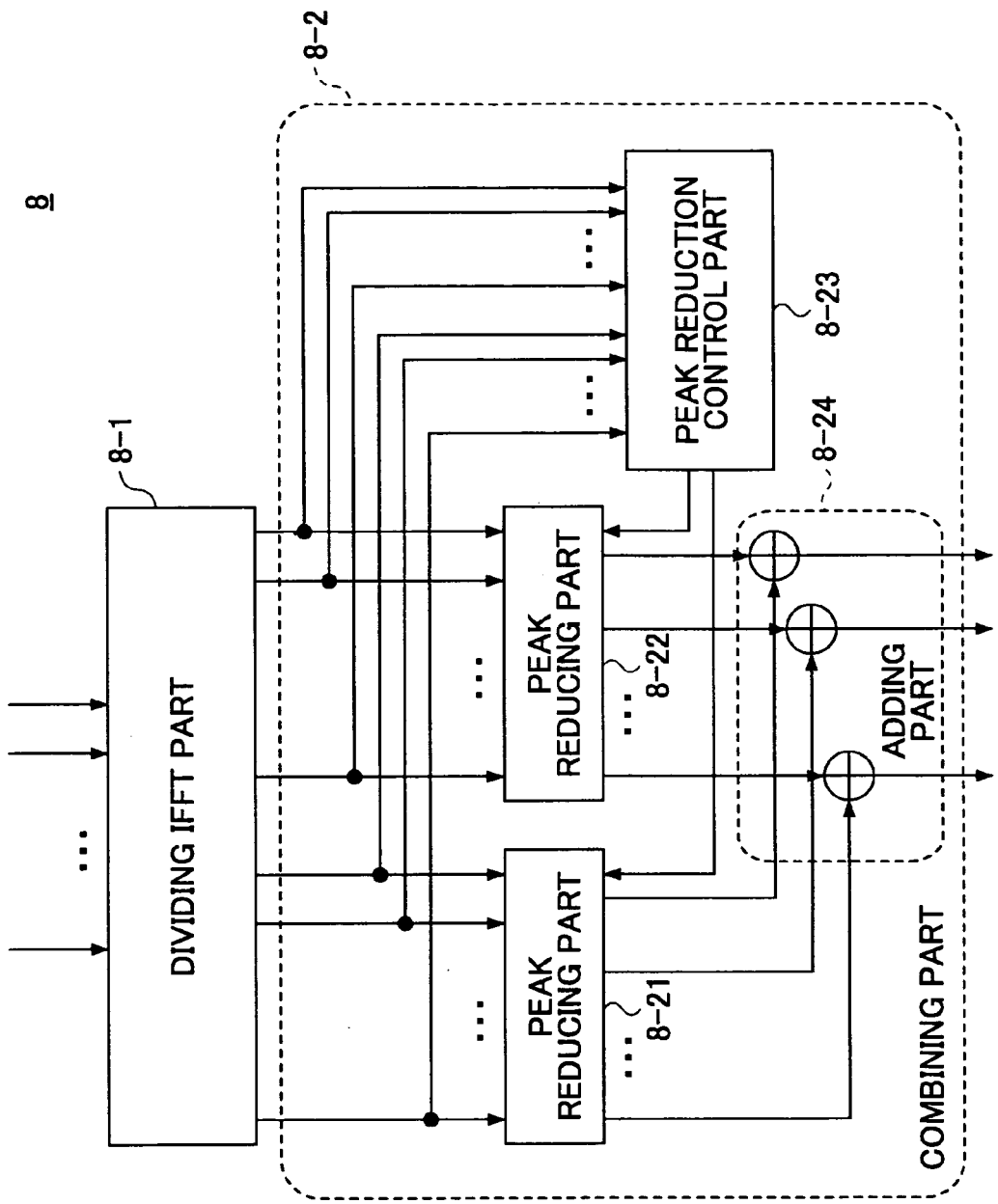
FIG. 3 shows a block diagram illustrating a low peak IFFT part.

Embodiments of the present invention are described with reference to figures.

Throughout the figures illustrating the embodiments of the present invention, the same reference numerals are given to parts/components having the same functions, and duplicated description therefor is omitted.

Figure 5:
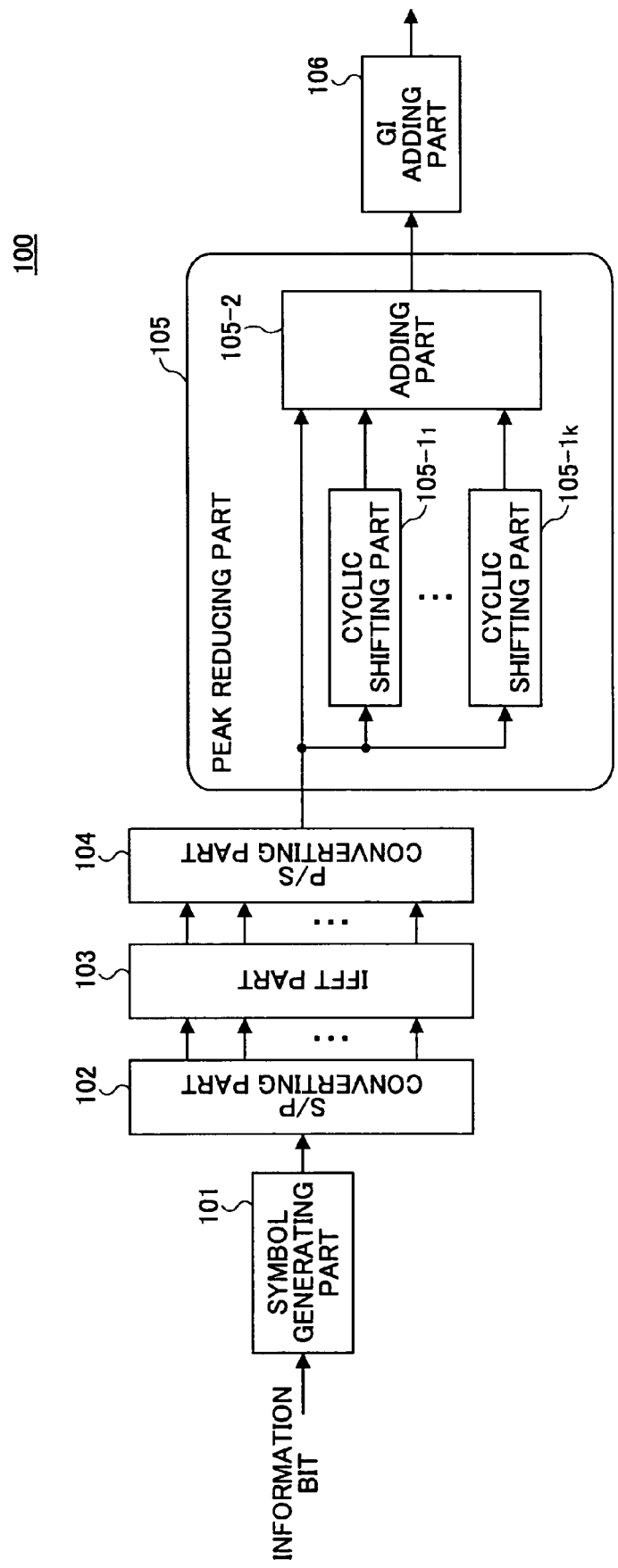
FIG. 5 shows a block diagram illustrating a transmitter according to a first embodiment of the present invention.

With reference to FIG. 5, a transmitter according to a first embodiment of the present invention is described.

The transmitter 100 in the first embodiment includes a symbol generating part 101 to which information bits are input; a S/P (serial/parallel) converting part 102 connected with the symbol generating part 101; an IFFT (inverse fast Fourier transform) part 103 connected to the S/P converting part 102; a P/S (parallel/serial) converting part 104 connected to the IFFT part 103; a peak reducing part 105 connected to the P/S converting part 104; and a GI adding part 106 connected to the peak reducing part 105. The peak reducing part 105 includes cyclic shifting parts 105-1$_1$ through 105-1$k$ (k is an integer and k>0) and an adding part 105-2 connected to the P/S converting part 104. The cyclic shifting parts 105-1$_1$ through 105-1$k$ are connected to the adding part 105-2, which is connected to the GI adding part 106.

The symbol generating part 101 carries out, on the input information bit series, error correction coding, interleaving, symbol mapping and so forth so as to generate transmission symbols, which are then input to the S/P converting part 102. The S/P converting part 102 converts the input transmission symbols in a serial form into a parallel form, and inputs the thus-obtained signal into the IFFT part 103. The IFFT part 103 transforms the input signal into an orthogonal multi-carrier signal, and inputs the thus-obtained signal to the P/S converting part 104. The P/S converting part 104 converts the thus-input signal in the parallel form into a serial form, and inputs the thus-obtained signal into the peak reducing part 105. Processing in the peak reducing part 105 is described next. Each of the cyclic shifting parts 105-1$_1$ through 105-1$k$ generates a signal shifted by a shift amount different from each other, and inputs the thus-obtained signal to the adding part 105-2.

The adding part 105-2 adds the signal from the P/S converting part 104 with the signals from the respective cyclic shifting parts 105-1$_1$ through 105-1$k$, together, and inputs the thus-obtained signal to the GI adding part 106. The GI adding part inserts a guard interval which includes a copy of a part of the given signal. The thus-obtained signal is then transmitted via the antenna.

In this case, the shift amounts of the respective cyclic shifting parts 105-11 through 105-1k should be determined. These shift amounts may be fixed. For example, the shift amount of i-th cyclic shifting part can be i points.

Next, it is proved that peak voltage suppression effect is obtained if fixed shift amounts are applied.

First, a symbol having the maximum amplitude in the transmission signal s(t) is referred to as $s_{max}$. Further, a symbol max(|s'(t)|) having the maximum amplitude in the transmission signal s'(t) obtained after the peak suppression processing is carried out, is referred to as $s'_{max}$.

When $$s'_{max} = 0.5 \times (s(t1) + s(t2)), \text{ and}$$

$$s(t1) = s_{max},$$

then $$s'_{max} = 0.5 \times (s_{max} + s(t2)).$$

If $|s_{max}| < |s'_{max}|$, the following formulas hold:

$$|s_{max}| < |0.5 \times (s_{max} + s(t2))|,$$

$$|s_{max}| < |s(t2)|.$$

This result contradicts $|s_{max}| > |s(t2)|$.

Further, when $s(t1) \neq s_{max}$, and assuming that $|s(t1)| \geq |s(t2)|$ and $|s_{max}| < |s'_{max}|$, the following formulas hold:

$$|s_{max}| < |s'_{max}| = |0.5 \times (s(t1) + s(t2))|,$$

$$|s_{max}| < |0.5 \times (s(t1) + s(t2))|,$$

$$|s_{max}| < |s(t1)|.$$

This result contradicts $|s_{max}| > |s(t1)|$.

Accordingly, $|s_{max}| > |s'_{max}|$ should hold.

In this first embodiment, communication quality may differ among subcarriers as a result of amplitudes of the respective subcarriers differing thereamong in the signals obtained from the combining. However, by carrying out coding or code spreading in the frequency direction, it is possible to avoid such difference in the communication quality among the respective subcarriers.

Further, in the transmitter 100 according to the first embodiment, transmission power of the entire transmission signal obtained after the peak reduction changes. However, this problem can be solved as follows. That is, a processing part is provided for normalizing the transmission power after the peak reduction, to a fixed level, whereby the transmission power is fixed.

Figure 6:
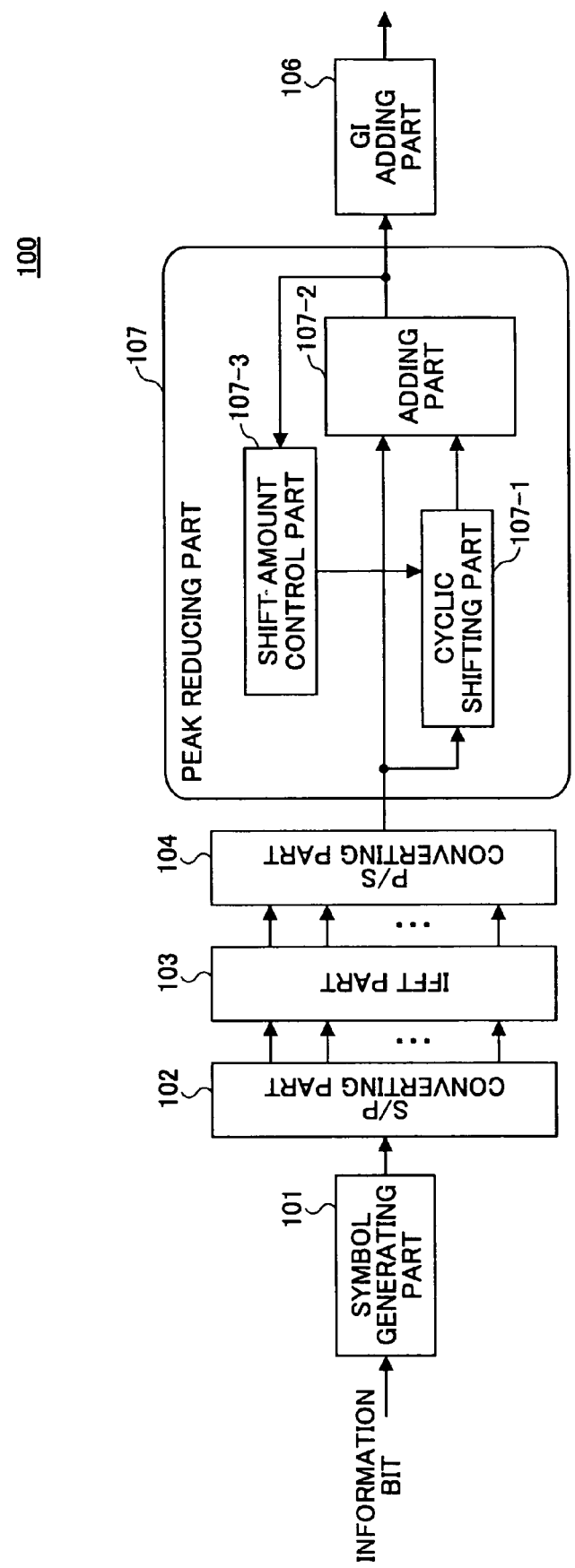
FIGS. 6 and 7 show block diagrams illustrating a transmitter according to a second embodiment of the present invention.

A transmitter according to a second embodiment of the present invention is described now with reference to FIG. 6.

In the first embodiment described above, the shift amounts in the cyclic shifting parts are fixed. However, by adaptively controlling the shift amounts, it is possible to achieve PAPR reduction more effectively.

The transmitter 100 in the second embodiment is different in a configuration of the peak reducing part from that of the transmitter described above with reference to FIG. 5.

The peak reducing part 107 according to the second embodiment includes the cyclic shifting part 107-1 and an adding part 107-2 connected to the P/S converting part 104, and a shift amount control part 107-3 connected to the cyclic shifting part 107-1 and the adding part 107-2. The cyclic shifting part 107-1 is connected to the adding part 107-2, and the adding part 107-2 is connected to the GI adding part 106. Description is made below assuming that only the single cyclic shifting part is applied, for example.

The shift amount control part 107-3 determines the shift amount in such a manner that the peak of the peak suppressed signal obtained from the addition (by means of the addition part 107-2) may be minimized.

Figure 7:
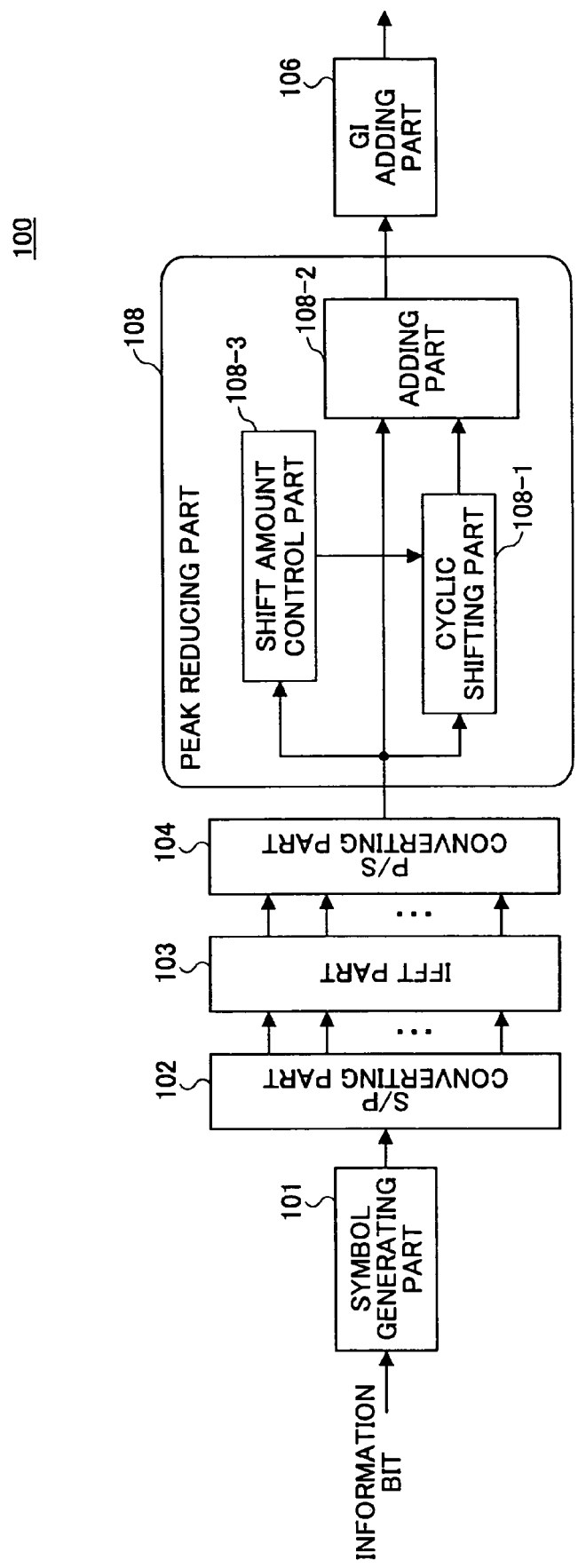

However, if the peak detection is carried out for all the transmission symbols obtained from the addition, a large amount of processing is required. In order to solve this problem, the peak reducing part 108 shown in FIG. 7 may be applied instead of the above-described peak reducing part 107 of FIG. 6.

The peak reducing part 108 includes the cyclic shifting part 108-1, an adding part 108-2 and the shift amount control part 108-3 connected to the P/S converting part 104. The cyclic shifting part 108-1 is connected to the adding part 108-2, and the adding part 108-2 is connected to the GI adding part 106. The shift amount control part 108-3 is connected to the cyclic shifting part 108-1.

In this case, the OFDM signal before the GI is inserted is input to the shift amount control part 108-3. The shift amount control part 108-3 observes only N symbols (N is a predetermined natural number not less than 1) causing a peak before the adding processing is carried out by the adding part 108-2, and selects a shift amount such as to minimize the peak appearing when these symbols are added together. Alternatively, the shift amount control part connected to the P/S converting part 104 and the adding part 108-2 may be provided, and thereby, the shift amount such as to minimize the peak appearing from the addition may be determined based on both the peak of the peak suppressed signal obtained from the addition as well as the N arbitrary symbols before being added causing the peak.

Thus, in the transmitter 100 according to the second embodiment, transmission is carried out after the transmission signal and the signal obtained from being shifted from the transmission signal by the shift amount such as to effectively reduce the peak are added together, and thus, peak suppression can be carried out. Further, the same processing may be carried out also on the pilot signal, and thus, it is not necessary to especially provide a control signal.

In the transmitter 100 according to the second embodiment, a plurality of the cyclic shifting parts 108-1 may be provided. In this case, the shift amounts are determined in a sequential manner described later. Thereby, it is possible to efficiently determine the shift amounts without applying all the shift amounts of all the cyclic shifting parts.

Figure 8:
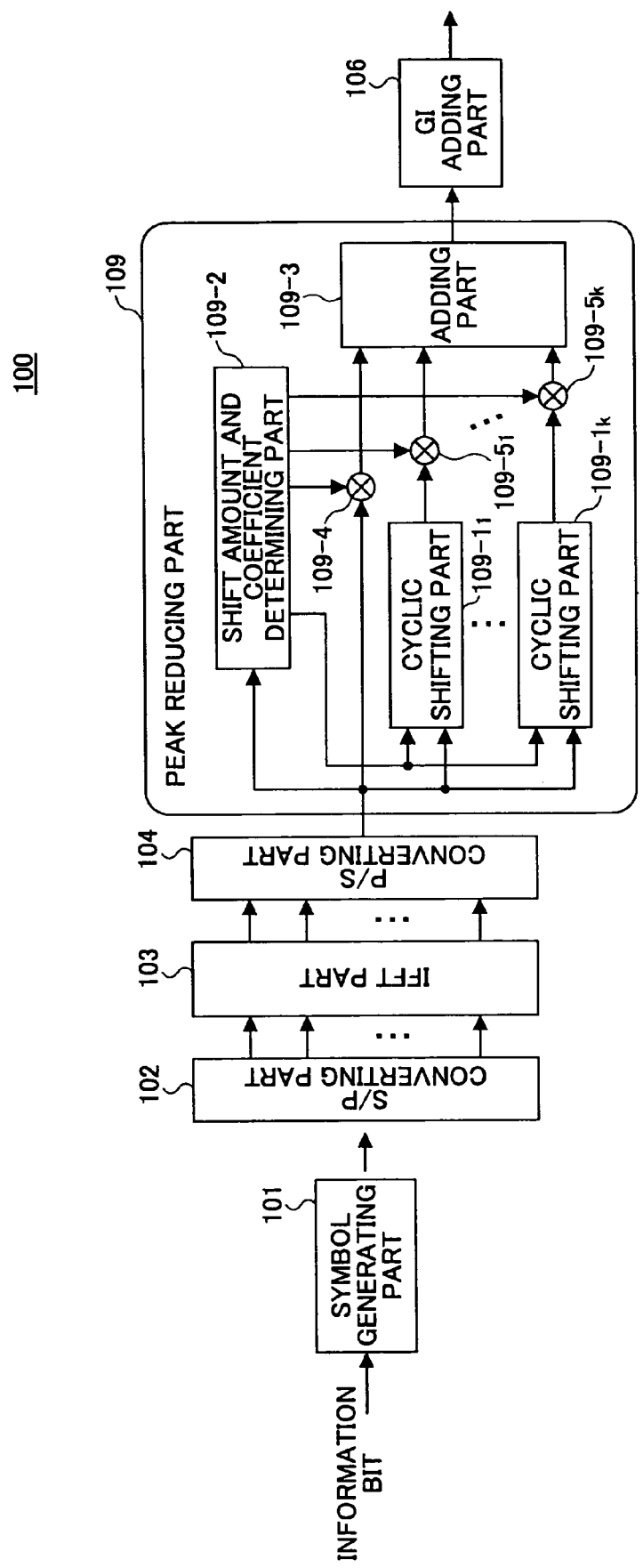
FIG. 8 shows a block diagram illustrating a transmitter according to a third embodiment of the present invention.

A transmitter according to a third embodiment of the present invention is described with reference to FIG. 8.

The transmitter 100 according to the third embodiment is different from the transmitter described with reference to FIG. 5 in the configuration of the peak reducing part.

The peak reducing part 109 according to the third embodiment includes cyclic shifting parts 109-1$_1$ through 109-1k, a shift amount and coefficient determining part 109-2 and a multiplier 109-4 connected to the P/S converting part 104, multiplier 109-5$_1$ through 109-5k connected to the cyclic shifting parts 109-1$_1$ through 109-1k respectively, and an adding part 109-3 connected to the multipliers 109-1$_1$ through 109-1k. The shift amount and coefficient determining part 109-2 is connected to the cyclic shifting parts 109-1$_1$ through 109-1k and the multipliers 109-5$_1$ through 109-1k, and the adding part 109-3 is connected to the GI adding part 106.

In the embodiment described above, only the shift amount is controlled. According to the third embodiment, the multipliers 109-4, 109-5$_1$ through 109-5k multiply the signals obtained from the cyclic shifting and output signals of the P/S converting part 104 with complex coefficients such as to further reduce the peak power. Thereby, it is possible to effectively reduce the peak power.

Here, a case is assumed that the single cyclic shifting part is applied, and the symbol acting as the peak in the OFDM signal before the peak reduction is referred to as s(tp). For a case where a cyclic shift amount in the cyclic shifting part is t' and coefficients for the multipliers 109-4 and 109-5$_1$ are $w_1$ and $w_2$, outputs of the adding part for s(tp) become following two signals:

$$s'_1 = w_1 \times s(tp) + w_2 \times s(\mathrm{mod}(tp - t' + N_{FFT}, N_{FFT})); \text{ and}$$

$$s'_2 = w_2 \times s(\mathrm{mod}(tp + t', N_{FFT})) + w_1 \times s(tp).$$

Therefrom, it is seen that s(tp) contributes to the two symbols. Accordingly, it is seen that, upon applying only s(tp), max(s'1, s'2) should be minimized.

A method of determining the weights is described now.

When the shift amount t' is determined, the weights are determined in such a manner that a phase of one of the symbols of s(tp+t') and s(tp−t') having the smaller amplitude may be opposite to a phase of s(tp), and the amplitudes of the weights are adjusted to make |s'$_1$| and |s'$_2$| closer.

A method of determining the phase rotation angle is described. The shift amount and coefficient determining part 109-2 obtains the phase rotation amount by carrying out the following calculation, where θ denotes the phase ration amount to obtain:

$$\theta_1 = \pi[\arg(s(\mathrm{mod}(tp - t' + N_{FFT}, N_{FFT}))) - \arg(s(tp))];$$

$$\theta_2 = \pi - [\arg(s(\mathrm{mod}(tp + t', N_{FFT}))) - \arg(s(tp))]; \text{ and}$$

$$\theta = \{|s(\mathrm{mod}(tp + t', N_{FFT}))| \times \theta_1 + |s(\mathrm{mod}(tp - t' + N_{FFT}, N_{FFT}))| \times \theta_2\} / \{|s(\mathrm{mod}(tp - t' + N_{FFT}, N_{FFT}))| + |s(\mathrm{mod}(tp + t', N_{FFT}))|\}.$$

As to the shift amount t', search may be carried out for all the shift amounts. However, a predetermined scope may be determined to be searched for detecting the shift amount.

Thus, according to the third embodiment, the cyclically shifted signals are added after they are multiplied with the complex coefficients. As a result, it is possible to effectively reduce the peak power.

In the above-mentioned scheme, calculation of the weights are carried out for each shift amount, and the shift amount and the weights which result in peak reduction are selected. However, it is also possible to estimate the shift amount which achieves a large peak reduction without calculating the weights. For example, the shift amount such that Re{s(tp+t')×s(tp−t')/ s(tp)$^2$} may be maximum or more than a fixed value may be searched for, and then, the weights are calculated for the thus-obtained shift amount.

Figure 9:
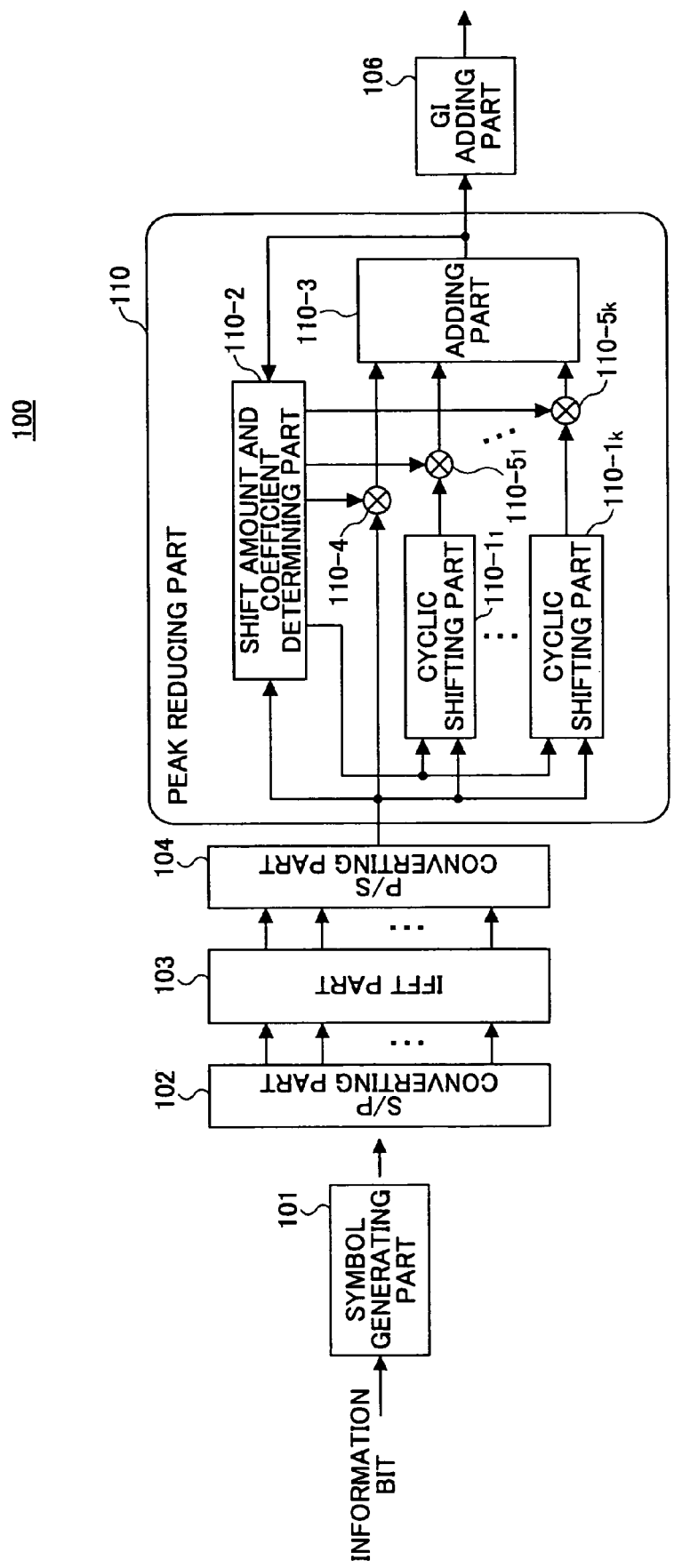
FIG. 9 shows a block diagram illustrating a transmitter according to a fourth embodiment of the present invention.

A transmitter according to a fourth embodiment of the present invention is described with reference to FIG. 9.

The transmitter 100 according to the fourth embodiment is different from the transmitter described with reference to FIG. 5 in the configuration of the peak reducing part.

The peak reducing part 110 according to the fourth embodiment includes cyclic shifting parts 110-1$_1$ through 110-1$k$, a multiplier 110-4 and shift amount and coefficient determining part 110-2 connected to the P/S converting part 104, multipliers 110-5$_1$ through 110-5$k$ connected to the cyclic shifting parts 110-1$_1$ through 110-1$k$ respectively, and an adding part 110-3 connected to the multipliers 110-1$_1$ through 110-1$k$. The shift amount and coefficient determining part 110-2 is connected to the cyclic shifting parts 110-1$_1$ through 110-1$k$ the multipliers 110-1 and 110-5$_1$ through 110-5$k$. Further, the output signal of the adding part 110-3 is input to the shift amount and coefficient determining part 110-2. Further, the adding part 110-3 is connected to the GI adding part 106.

For the above-described embodiment, the case where the single cyclic sifting part is applied has been described. In the fourth embodiment in which the plurality of cyclic shifting parts are applied, transmission signals are generated for all the cases of a plurality of previously prepared shifting amounts and weights, and, from thereamong, the signal having lowest peak should be selected to be actually transmitted. For the fourth embodiment, a method for determining th shifting amounts and weights effectively in the case where the plurality of cyclic shifting parts are applied.

A case where the shift amounts and the complex coefficients are calculated repetitively is described.

First, the shift amount and coefficient determining part 110-2 produces the peak suppressed signal only with the use of the output signal of the first cyclic shifting part 110-1$_1$.

Next, the shift amount and the complex coefficient of the first cyclic shifting part 110-1$_1$ are fixed, while, the transmission signal and the output signal of the first cyclic shifting part 110-1$_1$ are added together, then, the shift amount and the complex coefficient of the second cyclic shifting part 110-1$_2$ are determined in such a manner as to suppress the peak of thus-obtained signal.

At this time, the shift amount and the complex coefficient of the second cyclic shifting part 110-1$_2$ may be determined in such a manner that the peak in the signal obtained from combination of the outputs of the cyclic sifting parts 110-4, 110-5$_1$ and 110-5$_2$ may become smaller. The same processing is carried out repetitively through the k-th cyclic shifting part 110-1$k$.

Thereby, it is possible to determine the shift amounts and the complex coefficients efficiently without taking into account all the shift amounts of all the cyclic shifting parts 110-1$_1$ through 110-1$k$ and the weights applied by the multipliers 110-5$_1$ through 110-5$k$.

Further, in the above-described scheme of determining the complex coefficients sequentially, the average transmission power of all the transmission signals obtained after the peak reduction changes according to the given weights. This problem may be solved by providing a processing part which normalizes the average transmission power of the peak reduced signal.

Figure 10:
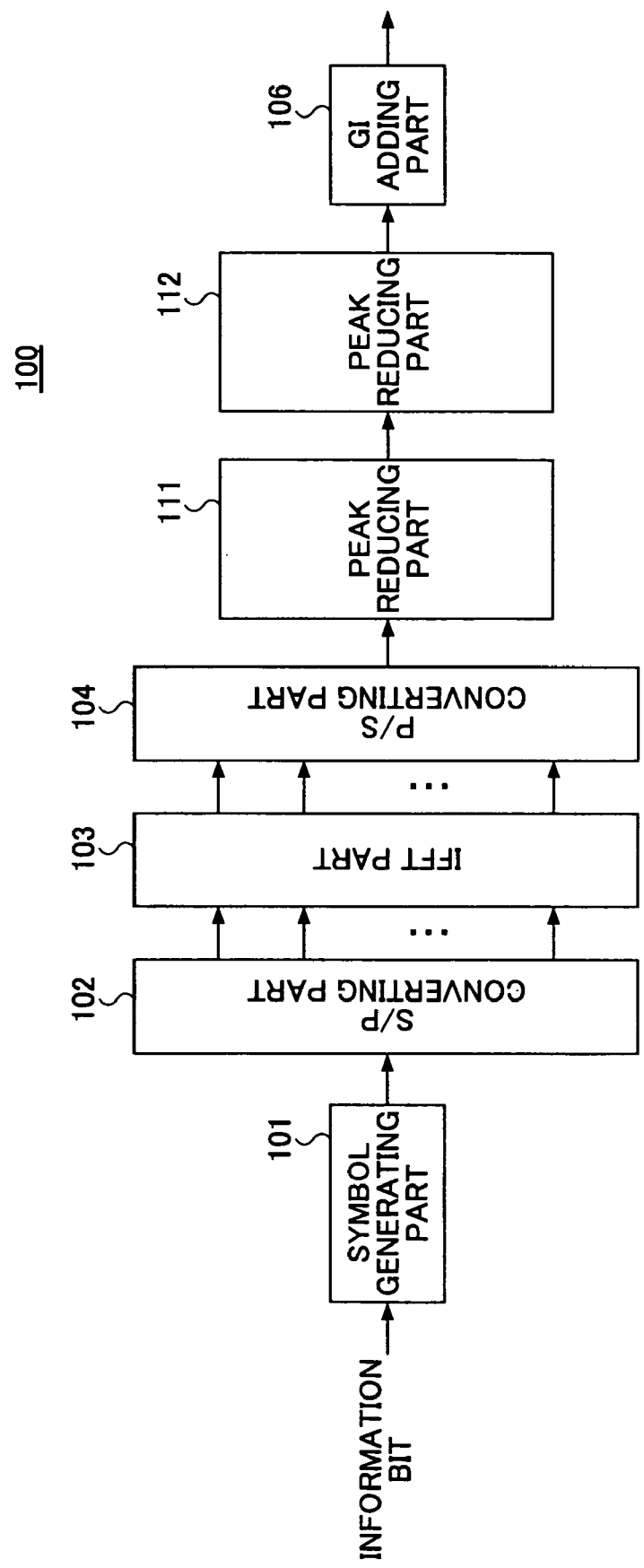
FIG. 10 shows a block diagram illustrating a transmitter according to a fifth embodiment of the present invention.

A transmitter according to a fifth embodiment of the present invention is described with reference to FIG. 10.

In the fifth embodiment, a plurality of the peak reducing parts are connected in series.

The peak reducing part in the transmitter 100 according to the fifth embodiment includes a peak reducing part 111 connected to the P/S converting part 104, and a peak reducing part 112 connected to the peak reducing part 111. The peak reducing part 112 is connected to the GI adding part 106.

According to the fifth embodiment, the two peak reducing parts 111 and 112 are connected. However, more than two peak reducing parts may be connected instead. A configuration of each peak reducing part may be the same as that in the above-described embodiment. A method for determining the shift amounts and the complex coefficients for the respective peak reducing parts may be the same as that in the above-described embodiment.

Thereby, it is possible to carry out peak suppression.

Figure 11:
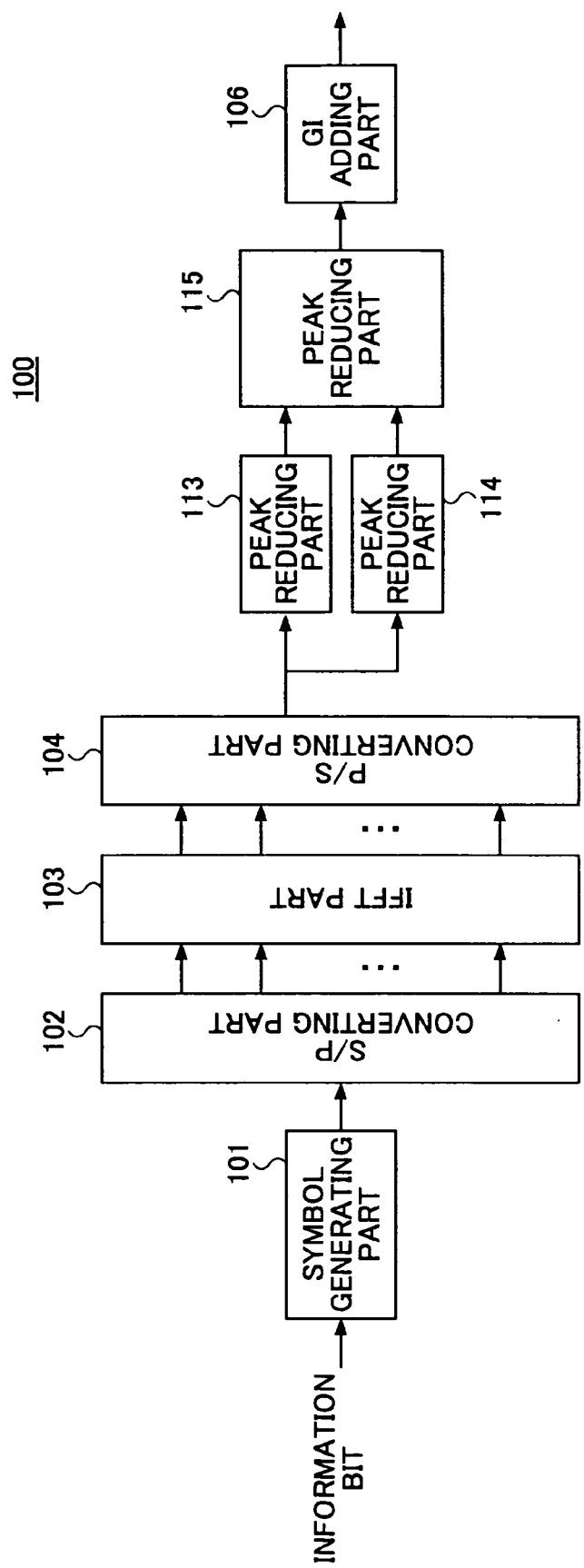
FIGS. 11 through 13 show block diagrams illustrating a transmitter according to a sixth embodiment of the present invention.

With reference to FIG. 11, a transmitter 100 according to a sixth embodiment is described.

In the transmitter 100 according to the sixth embodiment, a plurality of peak reducing parts are provided, some-of the peak reducing parts are disposed in parallel, and then, the outputs the peak reducing parts are connected as the input of another peak reducing part.

Figure 12:
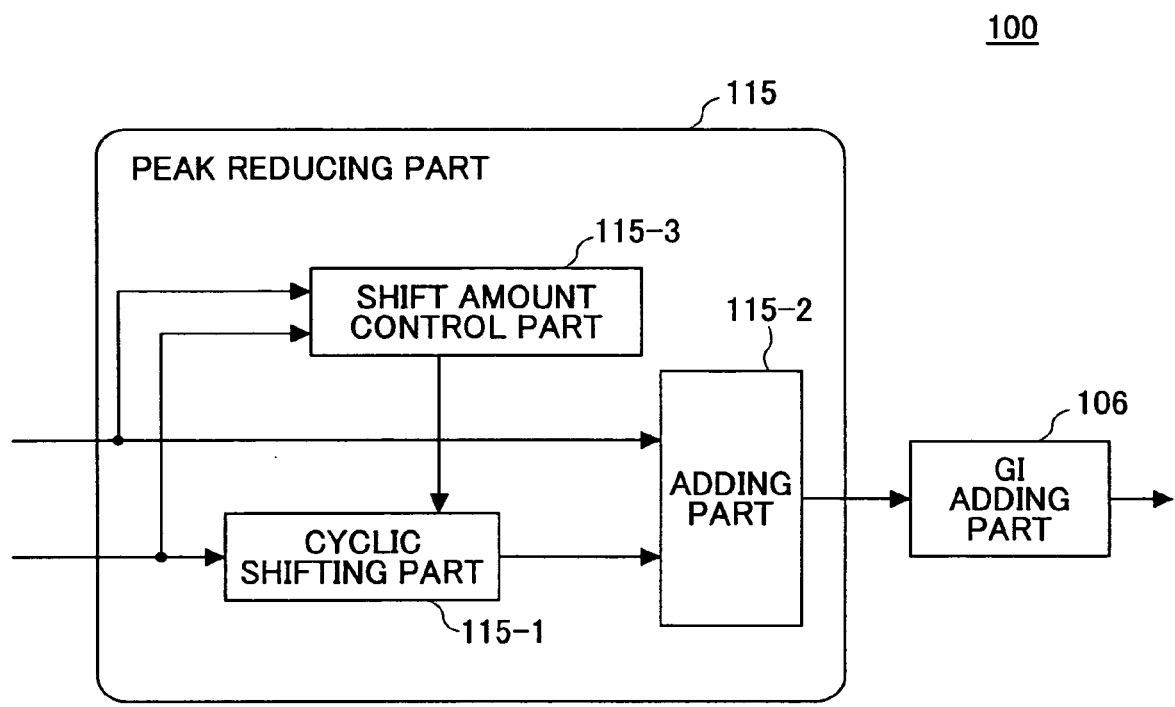

The peak reducing parts of the transmitter 100 according to the sixth embodiment includes the peak reducing parts 113 and 114 connected to the P/S converting part 104 and the peak reducing part 115 connected to the peak reducing parts 113 and 114. The peak reducing part 115 is connected to the GI adding part 106. In this case, as shown in FIG. 11, output signals of the peak reducing parts 113 and 114 are input to the peak reducing part 115. In this case, for example, as shown in FIG. 12, the output signal of the peak reducing part 113 is input to the adding part 115-2 and the shift amount control part 115-3, while the output signal of the peak reducing part 114 is input to the cyclic shifting part 115-1 and the shift amount control part 115-3.

It is not preferable that the peak reducing parts 113 and 114 disposed in parallel in the first stage carry out the same processing. Instead, for example, the first peak reducing part 113 thereof reduces the largest peak, while the second peak reducing part 114 reduces the second largest peak. Thereby, the plurality of the peak reducing parts carry out different processing, and thus, peak suppression can be carried out efficiently.

Further, the number of the peak reducing parts provided in the first stage in parallel may be increased to be more than two. Also in this case, the configuration of the peak reducing part to which output signals of the plurality of peak reducing parts may be similar to that in the above-described case having the two inputs. Thereby, it is possible that the more than two peak reducing parts provided in parallel carry out processing different thereamong, and thus, peak suppression can be carried out efficiently.

Figure 13:
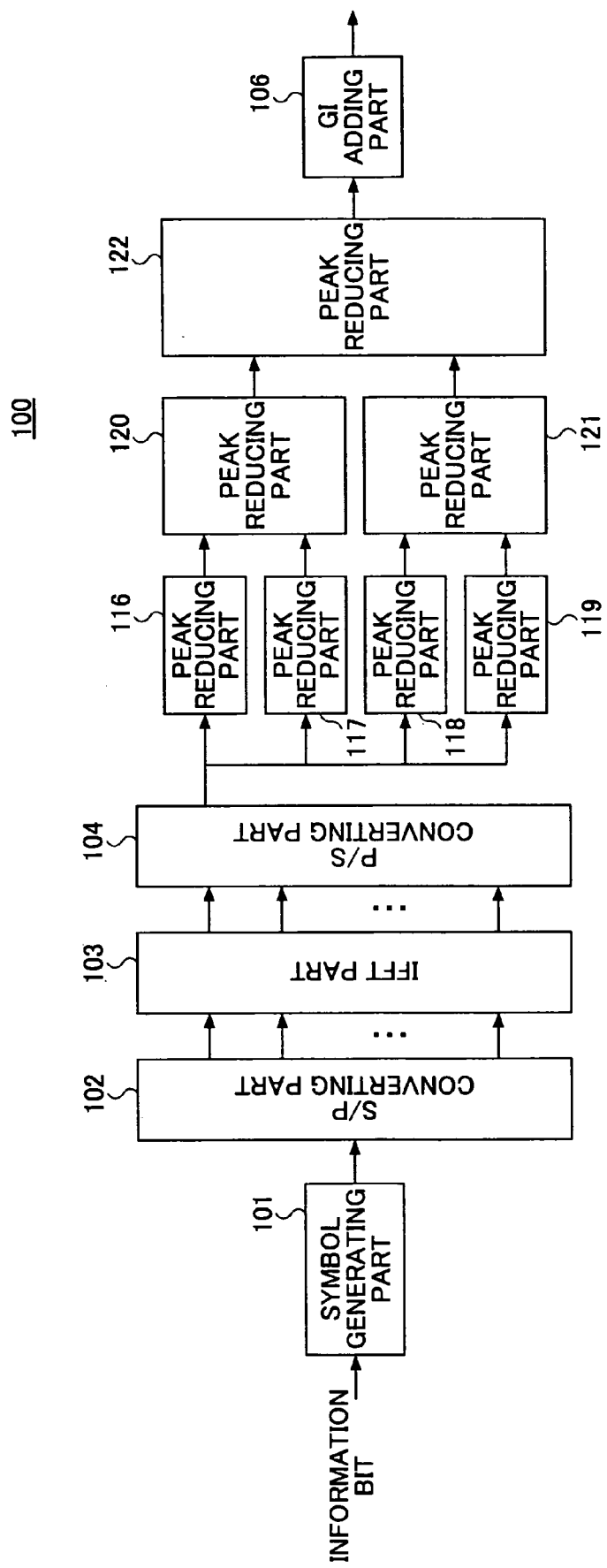
Figure 14:
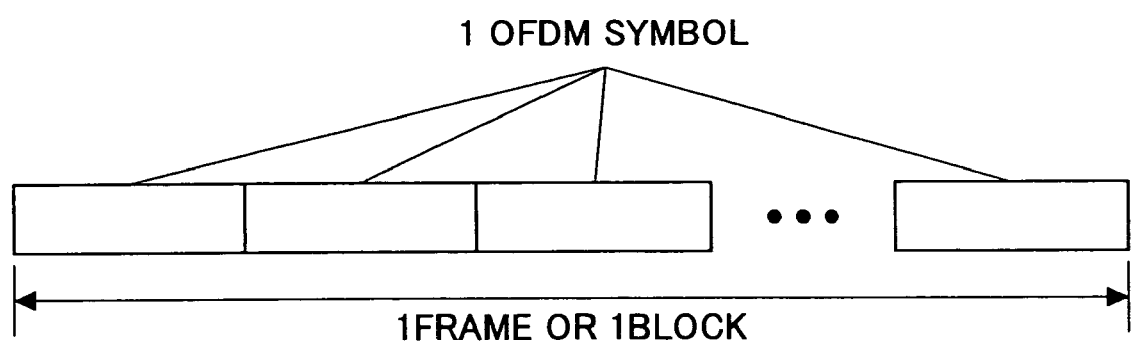
FIG. 14 shows a block diagram illustrating a transmitter according to a seventh embodiment of the present invention.

In this embodiment, the peak reducing parts have the two-stage configuration. However, the peak reducing parts may have a configuration of more than two stages. Thereby, it is possible to carry out peak suppression more efficiently. FIG. 13 shows an example of a case where the peak reducing parts have a three-stage configuration.

A transmitter 100 shown in FIG. 13 in which the peak reducing parts have the three-stage configuration includes peak reducing parts 116 through 119 connected to the P/S converting part 104, a peak reducing part 120 connected to the peak reducing parts 116 and 117, a peak reducing part 121 connected to the peak reducing parts 118 and 119, and a peak reducing part 122 connected to the peak reducing parts 120 and 121. The peak reducing part 122 is connected to the GI adding part 106.

A transmitter according to a seventh embodiment of the present invention is described now.

The configuration of the transmitter according to the seventh embodiment may be one of those described with reference to FIGS. 5 through 13, and duplicated description is omitted.

The cyclic shifting in the cyclic shifting part in the transmitter 100 described above may be carried out for each OFDM symbol. However, according to the seventh embodiment, the same shift amount, the same phase rotation amount, or the same shift amount and phase rotation amount are applied for the OFDM symbols included in a block or a frame.

In this case, as a result of the above-described peak reduction processing being carried out on the OFDM symbols also including the pilot symbol, a channel estimation value includes the information about the shift amounts and the weight. Thereby, the reception processing can be carried out without the need of especially transmitting the control signal.

A transmitter according to an eighth embodiment of the present invention is described.

The configuration of the transmitter according to the eighth embodiment may be one of those described with reference to FIGS. 5 through 13, and duplicated description is omitted.

In the above-described embodiments, no particular limitation is applied to the shift amounts to apply. However, in consideration of the channel estimation, it is essential to control the shift amount within a fixed amount.

In the transmitter 100 according to the eighth embodiment, the length of channel impulse response is input to the shift amount and coefficient determining part. The length of channel impulse response length cannot be directly measured by the transmitter 100. However, this may be fed back from the receiver, for example.

In a case where a scattered pilot signal is applied, the maximum shift amount should satisfy the following requirements:

(the number of $FFT$ points)/(pilot signal inserting interval (frequency direction))$\leq$(impulse response length)+(maximum shift amount).

Then, the peak suppression operation is carried out in a range such that the shift amount in each cyclic shifting part may fall within the thus-obtained maximum shift amount.

Thereby, it is possible to control the shift amount within the fixed amount, and, also for a subcarrier for which the scattered pilot signal is not inserted, transmission characteristics can be satisfactorily estimated by means of interpolation along the frequency direction.

Figure 15:
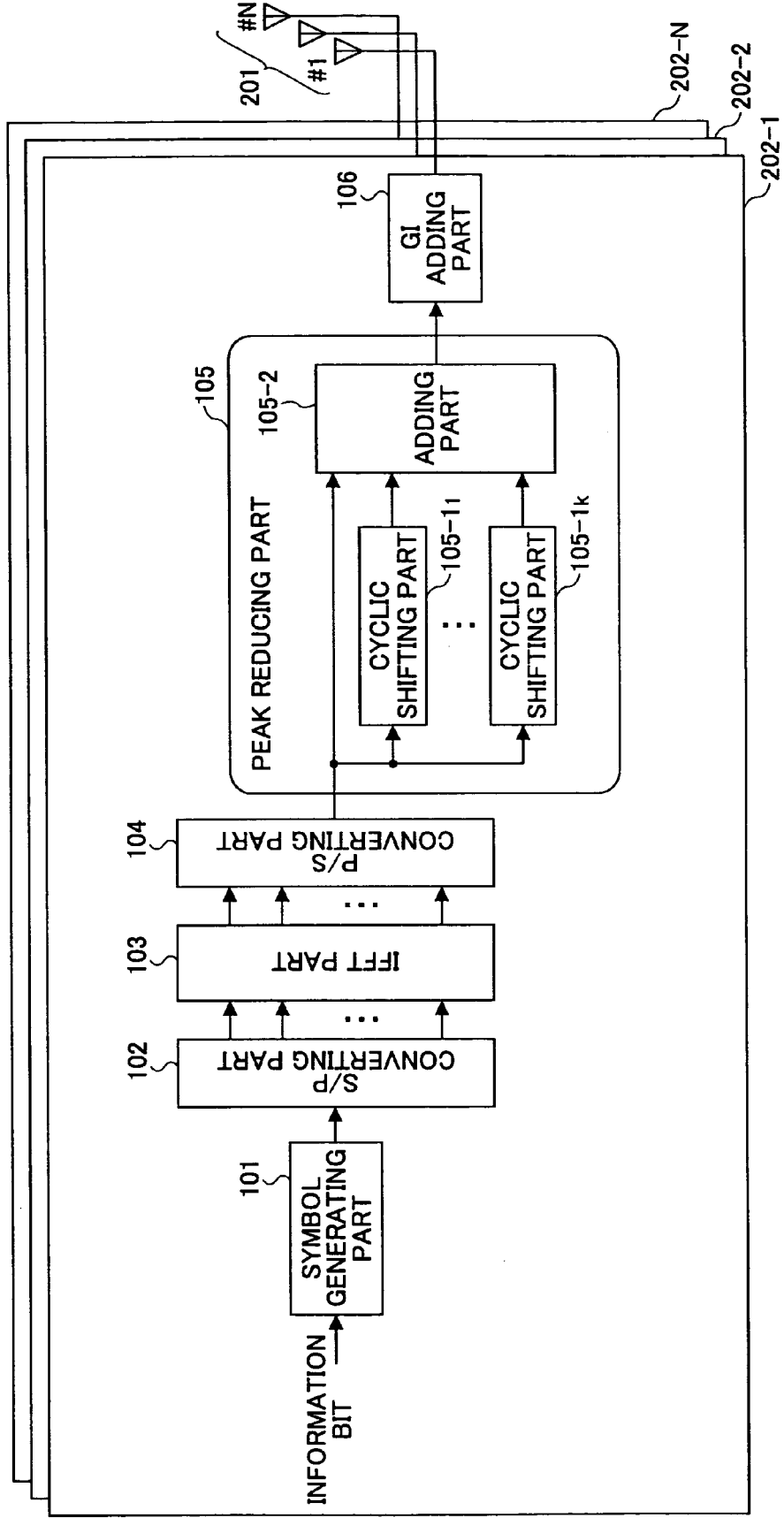
FIG. 15 shows a block diagram illustrating a transmitter according to a ninth embodiment of the present invention.

A transmitter according to a ninth embodiment of the present invention is described with reference to FIG. 15.

The transmitter 200 according to the ninth embodiment is an embodiment in which the peak suppression operation in the peak reducing part described above is applied to a space division multiplexing (SDM) transmission system. As shown in FIG. 15, this transmitter 200 includes a plurality of transmitting parts 202 (202-1 through 202-N) each including the symbol generating part 101, the S/P converting part 102, the IFFT part 103, the P/S converting part 104, the peak reducing part 105 and the GI adding part 106, the same as those in the transmitters described with reference to FIGS. 3 through 13. Also, the transmitter 200 includes antennas 201 connected to the transmitting parts 202 (202-1 through 202-N). Each information bit is input to each symbol generating part 101 of the transmitters 202 (202-1 through 202-N).

In the space division multiplexing transmission system, different transmission signal series are transmitted from the plurality of antennas. Therefore, the peak suppression operations in the peak reducing parts 105 are carried out independently. Further, in the case where the fixed complex coefficients and shift amounts are applied, the complex coefficients and the shift amounts applied in the transmitters 202-1 through 202-N should be different.

Further, the space division multiplexing transmission system may have a problem that signal separation may be difficult due to overlapping of received signal points. However, by applying different amplitude/phase for each transmission antenna, it is possible to avoid a situation that channels from some transmitters becomes similar, and thus signal separation becomes difficult. As a result, signal separation can be carried easily, and a low error rate can be achieved.

Figure 16:
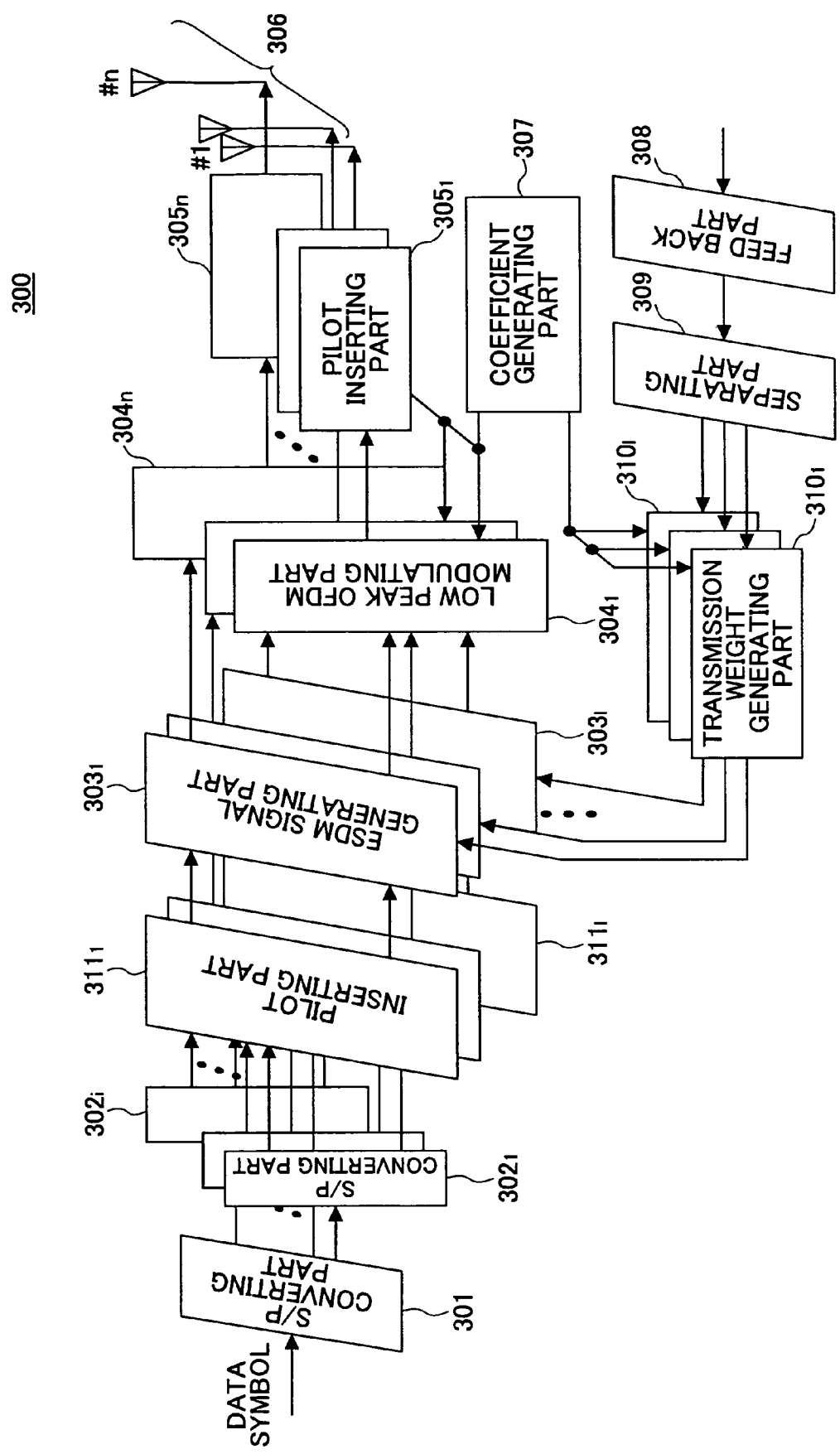
FIG. 16 shows a block diagram illustrating a transmitter according to a tenth embodiment of the present invention.

A transmitter according to a tenth embodiment of the present invention is described with reference to FIG. 16.

The transmitter 300 according to the tenth embodiment is an embodiment in which the peak suppression operation in the peak reducing part described above is applied to an eignbeam SDM (ESDM) system (see the above-mentioned non-patent document #4, for example).

The transmitter 300 of the tenth embodiment includes: an S/P converting part 301 to which data symbols are input; S/P converting parts $302_1$ through $302i$; pilot inserting parts $311_1$ through 3111 connected to the S/P converting parts $302_1$ through $302i$; ESDM signal generating parts $303_1$ through 3031 connected to the respective pilot inserting parts $311_1$ through 3111 respectively; low peak OFDM modulating parts $304_1$ through $304n$ connected to the ESDM signal generating parts $303_1$ through 3031;, pilot inserting parts $305_1$ through $305n$ connected to the respective low peak OFDM modulating parts $304_1$ through $304n$; antennas 306 (#1 through #n) connected to the pilot inserting parts $305_1$ through $305n$ respectively; a coefficient generating part 307 connected to each of the low peak OFDM modulating parts $304_1$ through $304n$; a feedback part 308 to which a feedback signal is input; a separating part 309 connected to the feedback part 308; and transmission weight generating parts $310_1$ through 3101 connected respectively to the coefficient generating part 307, the separating part 309 and the respective ESDM signal generating parts $303_1$ through 3031. In the transmitter 300 of FIG. 16, the low peak OFDM modulating parts $304_1$ through $304n$ include the above-described IFFT parts, peak reducing parts, P/S converting parts and GI adding parts.

First, in the coefficient generating part 307, the several shift amounts and complex coefficients are previously determined. In the convolution series generation, the shift amounts and the complex coefficients are determined in a random manner. As a relation among the convolution coefficient and the shift amount/weight, the convolution series is $[1\ w_1\ w_2\ \ldots\ w_x]$, where $w_x$ denotes the weight coefficient for a case of applying x-point cyclic shifting. There, x corresponds to the maximum sift amount. The convolution coefficient may be applied for all the transmission antennas in common, or, the different convolution coefficients may be applied for the respective transmission antennas.

The feedback signal input to the feedback part 308 is input to the separating part 309. The separating part 309 separates the feedback signal, and inputs the thus-separated signals to the transmission weight generating parts $310_1$ through 3101.

Each of the transmission weight generating parts $310_1$ through 3101 obtains a transfer function for the receiver from the input of the peak reducing part, that is, the coefficient generating part 307 generates signals of frequency domain corresponding to the generated coefficients, and outputs the same to the transmission weight generating parts $310_1$ through 3101, which multiply the thus-obtained signals with channel values of frequency domain between the transmission and reception antennas. The thus-obtained transfer function is used as the channel, to calculate the ESDM weight.

The ESDM signal generating parts $303_1$ through 3031 generate the ESDM signals based on signals obtained as a result of: the input symbols being S/P converted by means of the S/P converting part 301, the thus-obtained respective symbols being further S/P converted by means of the S/P converting parts $302_1$ through $302i$, and then, the pilot signals being inserted thereto by means of the pilot inserting parts $311_1$ through 3111, as well as the ESDM weights.

The low peak OFDM modulating parts $304_1$ through $304n$ carry out OFDM modulation on the ESDM signals in which the pilot signals are inserted. In this case, each of the low peak OFDM modulating parts $304_1$ through $304n$ carries out the same processing as the above-described IFFT part, peak reducing part, P/S converting part and GI part.

The OFDM signals have pilot signals inserted thereto by means of the pilot signal inserting parts $305_1$ through $305n$, and are transmitted. The pilot signals inserted there undergo neither the multiplication with the ESDM weights nor the peak reducing processing, and therefore, signals having low peaks should be previously selected as the pilot signals.

The pilot signals inserted in the pilot signal inserting parts $305_1$ through $305n$ have not undergone the peak reduction processing as well as multiplying with the ESDM weights, and thus, the values estimated from these pilot signals are the pure channel estimation values. These values are fed back to the transmitter, and are applied to generate the transmission weights. However, these channel estimation values are not those reflecting the peak reduction processing carried out in the transmitter. Therefore, it is not possible to directly detect the signals with the use of these channel estimation values.

On the other hand, the pilot signals inserted in the pilot inserting parts $311_1$ through 3111 have undergone the peak reduction processing, and thus, the channel estimation values detected from these pilot signals can be applied as the channel estimation values to detect the received signals.

By applying the above-described configuration, plural candidates of the transmission signals are obtained. Then, it is possible to select therefrom the transmission signals having the lowest peaks, and transmit the same. The number of these candidates of the transmission signals obtained is the same as the number of sets of the shift amounts and the complex coefficients.

Figure 17:
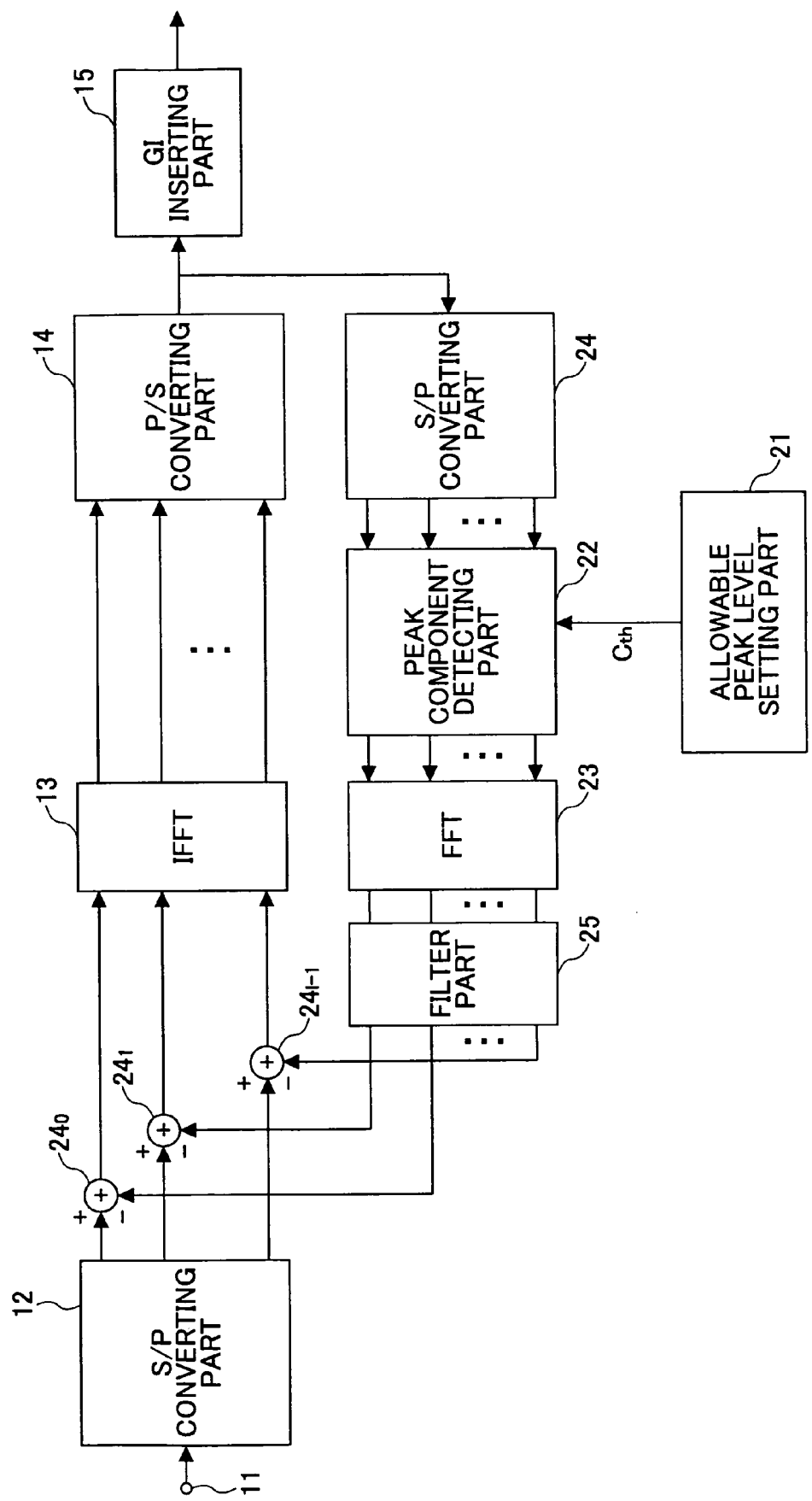
FIG. 17 shows a block diagram illustrating a transmitter suppressing a peak component of a transmission output.

A transmitter according to an eleventh embodiment of the present invention is described with reference to FIGS. 17 and 18.

The transmitter 400 in the eleventh embodiment employs the above-described peak suppression processing in the peak reducing part applied to a peak reduction method, in which each of the thus-obtained plurality of time-domain signal components is compared with a predetermined allowable peak level, the peak component exceeding the allowable peak level is thus detected, Fourier transform is carried out on the peak component, the thus-obtained frequency domain component is subtracted from the plurality of subcarrier signal components, and thus, the peak component of the transmission output is suppressed.

First, a configuration of the transmitter not including the above-described peak suppression operation in the peak reducing part is applied thereto is described with reference to FIG. 17. This transmitter includes a S/P converting part 12 in which information bits are input; adders $24_0$ through $24_{1-1}$ connected to the S/P converting part 12; an inverse Fourier transform (IFFT) part 13 connected to the adders $24_0$ through $24_{1-1}$; a P/S converting part 14 connected to the inverse Fourier transform part 13; a GI inserting part 15 connected to the P/S converting part 14; an allowable peak level setting part 21 for setting an allowable peak level Cth; a peak component detecting part 22 connected to the allowable peak level setting part 21 and the S/P converting part 24 for detecting a peak component exceeding the allowable peak level Cth from the output of the S/P converting part 24; a Fourier transform part 23 connected to the peak component detecting part 22 for carrying out Fourier transform (which means FFT in this case) on the peak component; and a filter part 25 connected to the Fourier transform part 23. The adders $24_0$ through $24_{1-1}$ subtract the outputs of the filter part 25 from the input signals of the inverse Fourier transform part 13.

The peak component detecting part 22 has the allowable peak level Cth given by the allowable peak level setting part 21, subtracts the allowable peak level Cth from the level of each time-domain signal component output from the S/P converting part 24, and thus, generates the peak components. However, when the level of the time-domain signal component is equal to or lower than the allowable peak level, the peak component detecting part 22 sets the peak component as being 0. In the transmitter configured as described above, the peak power reduction can be achieved.

Further, by repeating the peak reduction processing until the levels of all the time-domain signal components become equal to or less than the above-mentioned allowable peak level, it is possible to suppress the peak power less than the prescribed value without degrading the transmission performance. In this transmitter, it is possible to simplify the configuration and improve the processing speed, by previously storing, for each possible combination of the respective subcarriers components, the time-domain signal components obtained from carrying out the peak suppression processing including the above-mentioned inverse Fourier transform, peak component detection, Fourier transform and subtraction, and then, reading the thus-stored time-domain signal components corresponding to the relevant subcarriers signal components.

Next, with reference to FIG. 18, the transmitter according to the present embodiment, in which the above-mentioned peak suppression processing for the transmission output is actually applied to the transmitter described above, is described now.

The transmitter 400 according to the present embodiment is an embodiment in which the peak suppression operation of the peak reducing part in the embodiment described above is applied to the transmitter described above with reference to FIG. 17.

The transmitter 400 includes, a symbol generating part 101 to which information bits are input; a S/P (serial/parallel) converting part 102 connected with the symbol generating part 101; an IFFT (inverse fast Fourier transform) part 103 connected to the S/P converting part 102; subtracters $127_0$ through $127_{1-1}$ connected to the IFFT part 103; a P/S (parallel/serial) converting part 104 connected to the subtracters $127_0$ through $127_{1-1}$; a peak reducing part 123 connected to the P/S converting part 104; and a GI adding part 106 and a P/S converting part 124 connected to the peak reducing part 123; an allowable peak level setting part 121 for setting an allowable peak level Cth; a peak component detecting part 122 connected to the allowable peak level setting part 121 and detecting a peak component exceeding the allowable peak level Cth from the output of the S/P converting part 124; a Fourier transform part 123 connected to the peak component detecting part 122 for carrying out Fourier transform (which means FFT in this case) on the peak component; and a filter part 125 connected to the Fourier transform part 123. The output signal of the filter part 126 is input to the subtracters $127_0$ through $127_{1-1}$. The subtracters $127_0$ through $127_{1-1}$ subtract the outputs of the filter part 126 from the signals input to the P/S converting part 104.

The symbol generating part 101 carries out, on the input information bit series, error correction coding, interleaving, symbol mapping and so forth so as to generate transmission symbols, which are then input to the S/P converting part 102. The S/P converting part 102 converts the input transmission symbols in a serial form into a parallel form, and inputs the thus-obtained signal into the IFFT part 103. The IFFT part 103 transforms the input signal into an orthogonal multicarrier signal, and inputs the thus-obtained signal to the subtracters $127_0$ through $127_{1-1}$.

The peak component detecting part 122 has the allowable peak level Cth given by the allowable peak level setting part 121, subtracts the allowable peak level Cth from the level of each time-domain signal component output from the S/P converting part 124, and thus, generates the peak components. However, when the level of the time-domain signal component is equal to or lower than the allowable peak level, the peak component detecting part 122 sets the peak component as being 0. The peak component thus generated by the peak component detecting part 122 undergoes FFT processing and filtering, and then, is input to the subractor $127_0$ through $127_{1-1}$.

The subractor $127_0$ through $127_{1-1}$ subtract the peak components from the output signals of the IFFT part 103, and input the thus-obtained signals to the P/S converting part 104. The P/S converting part 104 converts the thus-input signal in the parallel form into a serial form, and inputs the thus-obtained signal into the peak reducing part 123. Processing in the peak reducing part 123 carries out peak reduction processing the same as that in the above-described embodiment. For example, as described above with reference to FIG. 5, each of the cyclic shifting parts $105-1_1$ through $105-1n$ generates a signal shifted by a shift amount different from each other, and inputs the thus-obtained signal to the adding part 105-2. The adding part 105-2 adds the signal from the P/S converting part 104 with the signals from the respective cyclic shifting parts $105-1_1$ through $105-1n$, together, and inputs the thus-obtained signal to the GI adding part 106 and the S/P converting part 124. The GI adding part inserts a guard interval which includes a copy of a part of the given signal. The thus-obtained signal having the guard interval inserted thereto is then transmitted via the antenna. On the other hand, the S/P converting part 124 converts the given signal in a serial form into a parallel form, and input the thus-obtained signal to the peak component detecting part 122.

By configuring so, it is possible to expect higher PAPR reduction effect. Further, it is possible to solve a problem that large noise power may be included in a transmission signal if peak reduction processing has been carried out thereon so as to solely obtain a large peak reduction effect.

A flow of processing in the present embodiment is as follows:

Step 1) First, peak reduction processing is carried out by the peak reducing part 123.

Step 2) Then, peak reduction processing is carried out by means of the parts 124 through 127.

Step 3) Then, the peak reduction processing the same as that in Step 1) is carried out by the peak reducing part 123.

The Steps 2) and 3) may be repeated, where processing carried out in Step 3) is the same as that carried out in Step 1).

In the above-described embodiment, the peak reduction processing can be recognized as a part of the channel by the receiver. Accordingly, it is possible to carry out the peak reduction processing without especially using a control signal concerning the peak reduction processing. Therefore it is possible to configure the receiver as a common one without considering the peak reduction processing.

The transmitter and the transmission control method according to the present invention can be applied to radio communication.

Further, the present invention is not limited to the above-described embodiments, and variations and modifications may be made without departing from the basic concept of the present invention claimed below.

The present application is based on Japanese Priority Application No. 2004-155032, filed on, May 25, 2004, the entire contents of which are hereby incorporated herein by reference.

What is claimed is:

1. A transmitter comprising:
   a peak reducing part carrying out peak reduction processing;

an OFDM signal generating part generating an OFDM signal from input information signal;

a cyclic shifting part generating a signal obtained cyclically shifted from the OFDM signal;

an adding part adding the OFDM signal and the cyclically shifted signal together;

a shift amount determining part determining a shift amount based on at least one of the OFDM signal and an output signal of said adding part, wherein said cyclic shifting part generates the signal cyclically shifted from the OFDM signal based on the shift amount determined by said shift amount determining part;

a weight generating part generating, based on the OFDM signal, weights for the OFDM signal and the cyclically shifted signal in such a manner that a peak power may be reduced; and a multiplying part multiplying the OFDM signal and the cyclically shifted signal with the weights generated by said weight generating part, wherein said adding part adds the output signals of said multiplying part together, and said weight generating part determines the weights $w_1$ and $w_2$ in such a manner that:

phases of $s(tp+t')$ and $s(tp-t')$ may be opposite from a phase of $s(tp)$, where $s(tp)$ denotes a symbol causing the peak of the OFDM signal; and $$|s_1'|=|s_2'|,$$

where:

$$s_1'=w_1 \times s(tp)+w_2 \times s(\mathrm{mod}(tp-t'+N_{FFT}, N_{FFT}))$$

$$s_2'=w_2 \times s(\mathrm{mod}(tp+t', N_{FFT}))+w_1 \times s(tp),$$

where $w_1$, $W_2$ denote the weights, mod denotes a remainder operator, $N_{FFT}$ ($N_{FFT}$ is an integer and $N_{FFT} > 0$) denotes an FFT point, and wherein t' denotes the shift amount.

2. The transmitter as claimed in claim 1, wherein:

the weights are determined such that:

amplitudes of $s(tp+t')$ and $s(tp-t')$ are compared, and, the smaller one may be in opposite phase with respect to $s(tp)$.

3. The transmitter as claimed in claim 2, wherein:

said weight generating part determines a phase rotation angle according to the following requirements:

θ denotes the phase rotation angle; and $s(tp)$ denotes a symbol causing a peak of the OFDM signal, $$\theta_1=\pi-[arg(s(\mathrm{mod}(tp-t+N_{FFT}, N_{FFT})))-arg(s(tp))];$$

$$\theta_2=\pi-[arg(s(\mathrm{mod}(tp+t, N_{FFT})))-arg(s(tp))]; \text{ and}$$

$$\theta=\{|s(\mathrm{mod}(tp+t, N_{FFT}))|\times\theta_1+|s(\mathrm{mod}(tp-t+N_{FFT}, N_{FFT}))|\times\theta_2\}/\{|s(\mathrm{mod}(tp-t+N_{FFT}, N_{FFT}))|+|s(\mathrm{mod}(tp+t, N_{FFT}))|\},$$

where mod denotes a remainder operator; and $N_{FFT}$ ($N_{FFT}$ is an integer and $N_{FFT} > 0$) denotes an FFT point.

4. The transmitter as claimed in claim 1, wherein:

said shift amount determining part determines the shift amount so that a value calculated by the following formula may be equal to or more than a fixed value:

$$\mathrm{Re}\{s(tp+t') \times s(tp-t')/s(tp)^2\}$$

where:

$s(tp)$ denotes a symbol causing a peak of the OFDM signal, and t' denotes the shift amount; and said weight generating part generates the weights based on the shift amount.

5. The transmitter as claimed in claim 1, comprising a plurality of the cyclic shifting parts, wherein:

said shift amount determining part determines the shift amount for each of said plurality of cyclic shifting parts based on at least one of the OFDM signal and the cyclically shifted signal; and said weight generating part generates the weights based on at least one of the OFDM signal and the cyclically shifted signal.

6. The transmitter as claimed in claim 1, wherein:

said shift amount determining part determines a maximum shift amount according to the following requirements, when a scattered pilot signal is applied:

((the number of FFT points)/(pilot signal inserting interval))≧(maximum shift amount)+(impulse response length), based on an input channel impulse response and interval of the pilot signal in frequency direction.

7. The transmitter as claimed in claim 1, further comprising:

a plurality of peak reducing parts, connected together in series or in parallel; wherein:

each peak reducing part comprises:

an OFDM signal generating part generating an OFDM signal from input information signal;

a cyclic shifting part generating a signal cyclically shifted from the OFDM signal; and an adding part adding the OFDM signal and the cyclically shifted signal together.

8. The transmitter as claimed in claim 1, further comprising:

a plurality of antennas, wherein:

said shift amount determining part and said weight determining part determine the shift amount or the weights in such a manner that the shift amounts and the weights for different antennas may be different for each antenna.

9. The transmitter as claimed in claim 1, comprising:

a coefficient generating part determining a plurality of the shift amounts and the weights;

a transmission weight generating part generating a second channel estimation value and generating a plurality of transmission weights, based on a channel estimation value, the plurality of shift amounts and weights;

an ESDM signal generating part generating a plurality of ESDM signals based on the plurality of transmission weights; and a selecting part selecting, from the plurality of ESDM signals, a signal having a low peak.

10. A transmission control method for a transmitter carrying out peak reduction processing, comprising:

generating an OFDM signal from an input information signal;

generating a signal cyclically shifted from the OFDM signal;

adding the OFDM signal and the cyclically shifted signal together;

determining a shift amount based on at least one of the OFDM signal and an output signal of said adding, wherein said generating a signal generates the signal cyclically shifted from the OFDM signal based on the determined shift amount;

generating, based on the OFDM signal, weights for the OFDM signal and the cyclically shifted signal in such a manner that a peak power may be reduced; and multiplying the OFDM signal and the cyclically shifted signal with the weights generated by said weight generating part, wherein said adding adds the output signals of said multiplying part together, and said generating weights determines the weights $w_1$ and $w_2$ in such a manner that:

phases of $s(tp+t')$ and $s(tp-t')$ may be opposite from a phase of $s(tp)$, where $s(tp)$ denotes a symbol causing the peak of the OFDM signal; and $|s_1'|=|s_2'|$, where:

$s_1'=w_1 \times s(tp)+w_2 \times s(\mathrm{mod}(tp-t'+N_{FFT}, N_{FFT}))$ $s_2'=w_2 \times s(\mathrm{mod}(tp+t', N_{FFT}))+w_1 \times s(tp)$, where $w_1$, $W_2$ denote the weights, mod denotes a remainder operator, $N_{FFT(NFFT}$ an integer and $N_{FFT}>0$ denotes an FFT point, and wherein t' denotes the shift amount.

* * * * *